US011575587B2

(12) United States Patent
Noro

(10) Patent No.: US 11,575,587 B2
(45) Date of Patent: Feb. 7, 2023

(54) INSPECTION PACKET PROCESSING DEVICE AND SYSTEM FOR DISCARDING AN INSPECTION PACKET FROM A LOOP

(71) Applicant: FUJITSU LIMITED, Kawasaki (JP)

(72) Inventor: Masaaki Noro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/376,212

(22) Filed: Jul. 15, 2021

(65) Prior Publication Data
US 2022/0103441 A1 Mar. 31, 2022

(30) Foreign Application Priority Data
Sep. 29, 2020 (JP) .............................. JP2020-163111

(51) Int. Cl.
*H04L 12/26* (2006.01)
*H04L 43/04* (2022.01)
*H04L 45/74* (2022.01)

(52) U.S. Cl.
CPC .............. *H04L 43/04* (2013.01); *H04L 45/74* (2013.01)

(58) Field of Classification Search
CPC ................................ H04L 43/04; H04L 45/74
USPC ......................................................... 370/241
See application file for complete search history.

(56) References Cited

U.S. PATENT DOCUMENTS

| 2005/0076140 A1* | 4/2005 | Fung ................... H04L 12/4625 709/245 |
| 2006/0280118 A1 | 12/2006 | Nomura et al. |
| 2006/0280130 A1 | 12/2006 | Nomura et al. |
| 2006/0285499 A1* | 12/2006 | Tzeng ..................... H04L 45/00 370/389 |
| 2011/0128863 A1* | 6/2011 | Hsieh .................... H04L 49/555 370/249 |
| 2017/0034056 A1* | 2/2017 | Mukherjee .............. H04L 49/25 |
| 2022/0060415 A1* | 2/2022 | Dutta ...................... H04L 41/12 |
| 2022/0209994 A1* | 6/2022 | Tai ......................... H04L 12/467 |

FOREIGN PATENT DOCUMENTS

| JP | 2006-352262 A | 12/2006 |
| JP | 2006-352263 A | 12/2006 |

* cited by examiner

Primary Examiner — Hee Soo Kim
(74) Attorney, Agent, or Firm — Fujitsu Patent Center

(57) ABSTRACT

An inspection device includes a memory and a processor. The processor is coupled to the memory and configured to transmit, to a network, an inspection packet that includes a first address for which a plurality of transfer devices in a network does not learn correspondences between the first address and transfer destination devices. The first address is a transmission destination address. The inspection device receives a first packet from the network and determines whether the first packet matches the inspection packet. The inspection devices transmits, to the network, a setting packet of which a transmission source address is set to the first address.

9 Claims, 20 Drawing Sheets

INSPECTION PACKET PROCESSING DEVICE AND SYSTEM FOR DISCARDING AN INSPECTION PACKET FROM A LOOP

CROSS-REFERENCE TO RELATED APPLICATION

This application is based upon and claims the benefit of priority of the prior Japanese Patent Application No. 2020-163111, filed on Sep. 29, 2020, the entire contents of which are incorporated herein by reference.

FIELD

The embodiment discussed herein is related to an inspection device, a packet processing device, and an inspection system.

BACKGROUND

When there is a loop path of a packet in a network, a broadcast storm of the packet occurs and thus, there is a concern that normal communication is hindered. On the other hand, in order to detect a loop path, for example, there is an inspection method for transmitting an inspection packet to a network and detecting a loop path in the network when the inspection packet is returned to and is received by a transmission source device.

U.S. Patent No. 2006/0285499 is disclosed as related art.

SUMMARY

According to an aspect of the embodiments, an inspection device includes a memory, and a processor coupled to the memory and configured to transmit an inspection packet that includes, as a transmission destination address, a first address for which a plurality of transfer devices in a network does not learn correspondences between the first address and transfer destination devices, to the network, receive a first packet from the network, determine whether the first packet matches the inspection packet, and instruct to transmit a setting packet of which a transmission source address is set to the first address to the network.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

When a loop path in an existing network is detected by using the above-described inspection method, since a network device such as a layer-2 switch is to be replaced with a new network device having an inspection function, there is a concern that a large amount of equipment cost is incurred. Thus, it is considered that an inspection is executed by coupling an inspection device on which the above-described inspection method is implemented to the network device in the existing network.

At this time, an inspection packet is transmitted from the inspection device to the network devices, and when there is the loop path between the network devices, the inspection packet is broadcast to each port of the network device and flows through the loop path. At this time, since the inspection device does not constitute the loop path, the inspection packet flowing through the loop path may not be discarded, and thus, there is a concern that the inspection packet applies the pressure on a communication band of the network by continuing to flow through the loop path.

Hereinafter, an embodiment of a technique capable of relieving the pressure on a communication band of a network due to transmission of an inspection packet for detecting a loop path to the network will be described.

[Configurations of Inspection System and Network]

Figure 1:
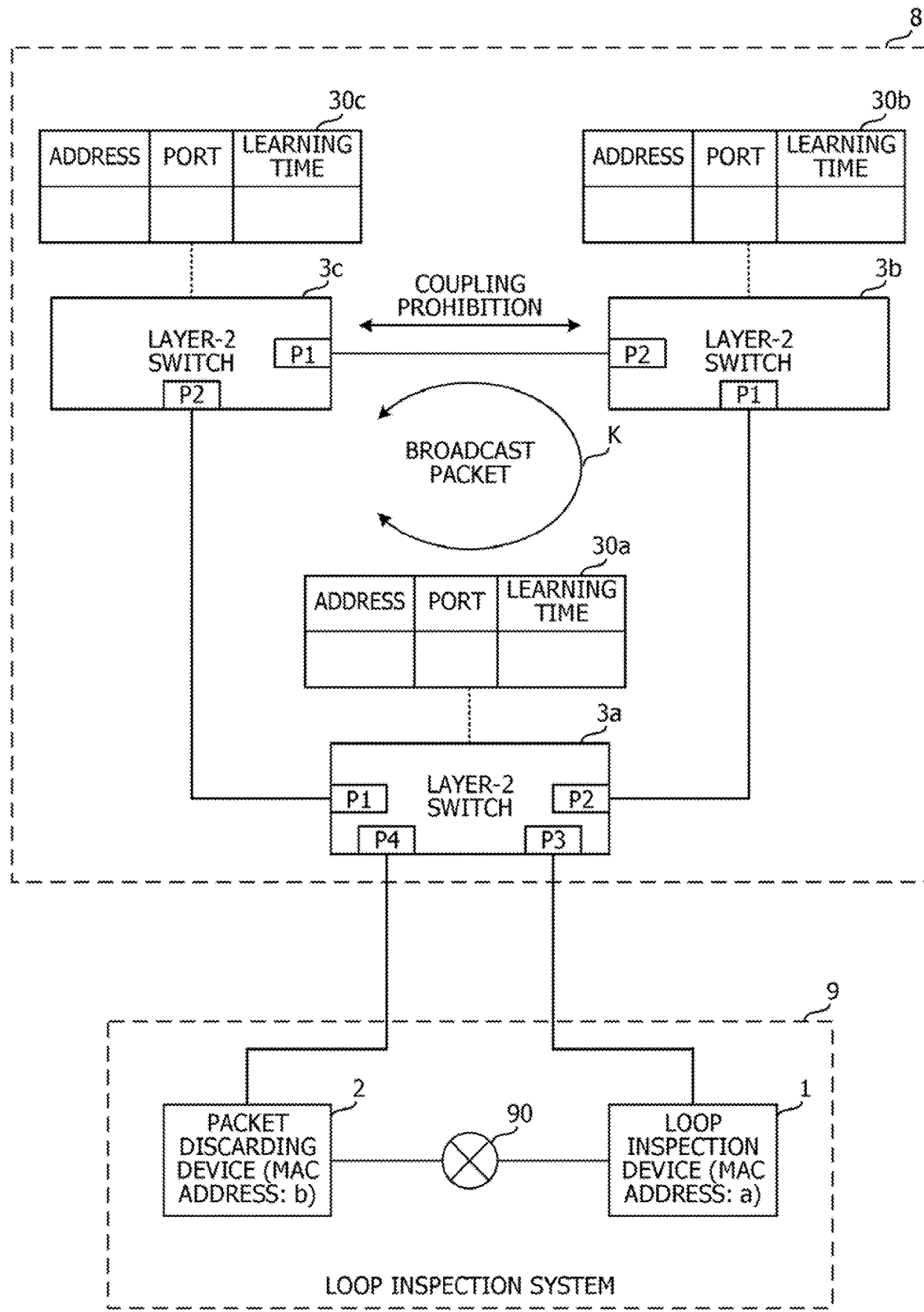
FIG. 1 is a configuration diagram illustrating examples of an inspection system and a network.

FIG. 1 is a configuration diagram illustrating examples of an inspection system 9 and a network 8. As an example, the network 8 includes layer-2 switches 3a to 3c constituting a wide area network. The number of layer-2 switches 3a to 3c included in the network 8 is not limited. In order to transmit and receive packets, the layer-2 switch 3a has ports P1 to P4, and the layer-2 switches 3b and 3c have ports P1 and P2.

The layer-2 switch 3a is installed, for example, in a data center of a communication carrier or a cloud carrier. The layer-2 switch 3a is a virtual network device over a computer such as, for example, a server.

The layer-2 switches 3b and 3c are installed, for example, in a data center of a client or the like. Although not illustrated, a network of the client or the like is coupled to the layer-2 switches 3b and 3c.

The layer-2 switch 3a is coupled to the other layer-2 switches 3b and 3c via, for example, a virtual private network (VPN). The port P1 of the layer-2 switch 3a is coupled to the port P2 of the layer-2 switch 3c, and the port P2 of the layer-2 switch 3a is coupled to the port P1 of the layer-2 switch 3b.

Coupling of a communication line is normally prohibited such that the layer-2 switches 3b and 3c on the client side may not communicate with each other. However, in this example, since the port P2 of the layer-2 switch 3b is coupled to the port P1 of the layer-2 switch 3c, a loop path K is formed between the layer-2 switches 3a to 3c.

Thus, for example, when communication of a routing protocol such as, for example, the Open Shortest Path Fast (OSPF) or the Routing Information Protocol (RIP), multicast communication, and communication of the Address Resolution Protocol (ARP), and the like are performed, there is a concern that broadcast packets flow through the loop path K and broadcast storms occur. At this time, since the layer-2 switches 3a to 3c transmit the broadcast packets received from the other network devices from the two ports P1 and P2, the number of broadcast packets becomes two and flow through the loop path K in both directions (clockwise and counterclockwise in the drawing). Accordingly, normal communication may not be performed.

The loop inspection system 9 is an example of the inspection system and executes a loop inspection for detecting the loop path K in the network 8. The loop inspection system 9 includes a loop inspection device 1 as an example of the inspection device and a packet discarding device 2 as an example of the packet processing device.

In this example, the loop inspection device 1 and the packet discarding device 2 are different servers. The loop inspection device 1 has a media access control (MAC) address "a", and the packet discarding device 2 has a MAC address "b". The loop inspection device 1 and the packet discarding device 2 are coupled to and communicate with each other via a cooperation network 90.

The loop inspection device 1 is coupled to the port P3 of the layer-2 switch 3a, and the packet discarding device 2 is coupled to the port P4 of the layer-2 switch 3a. Accordingly, the loop inspection device 1 and the packet discarding device 2 may transmit and receive a packet to and from the network 8.

Address learning tables 30a to 30c are provided in the layer-2 switches 3a to 3c, respectively. As an example, correspondences between addresses, ports, and learning times are registered in the address learning tables 30a to 30c. The address learning tables 30a to 30c are stored in storage means such as a memory.

The layer-2 switches 3a to 3c acquire transmission source addresses from the packets received by the ports P1 to P4, and when the transmission source addresses are not registered, register the transmission source addresses in address fields of the address learning tables 30a to 30c, and register the ports P1 to P4 that receive the transmission source addresses in port fields of the address learning tables 30a to 30c.

The layer-2 switches 3a to 3c register times when the addresses are registered in learning time fields of the address learning tables 30a to 30c. The layer-2 switches 3a to 3c cancel the registration when a predetermined cache period elapses from the learning time.

The layer-2 switches 3a to 3c search the address learning tables 30a to 30c for the ports P1 to P4 corresponding to transmission destination addresses of the packets and transfer the packets from the searched ports P1 to P4 to transfer destination devices. As stated above, the layer-2 switches 3a to 3c learn the correspondences between the addresses and the transfer destination devices. The layer-2 switches 3a to 3c are examples of a transfer device.

When the broadcast packets flow along the loop path K, the transmission source addresses are alternately associated with the ports P1 and P2 whenever the broadcast packets are received from the ports P1 and P2. Thus, unicast packets with the transmission source addresses as the transmission destination address do not reach the destination.

[Loop Inspection Method]

FIGS. 2 to 6 are diagrams illustrating an example of a loop inspection method. The loop inspection method is an example of the inspection method. Before the execution of the loop inspection, the MAC addresses of the loop inspection device 1 and the packet discarding device 2 are not registered in each of the address learning tables 30a to 30c of the layer-2 switches 3a to 3c.

Figure 2:
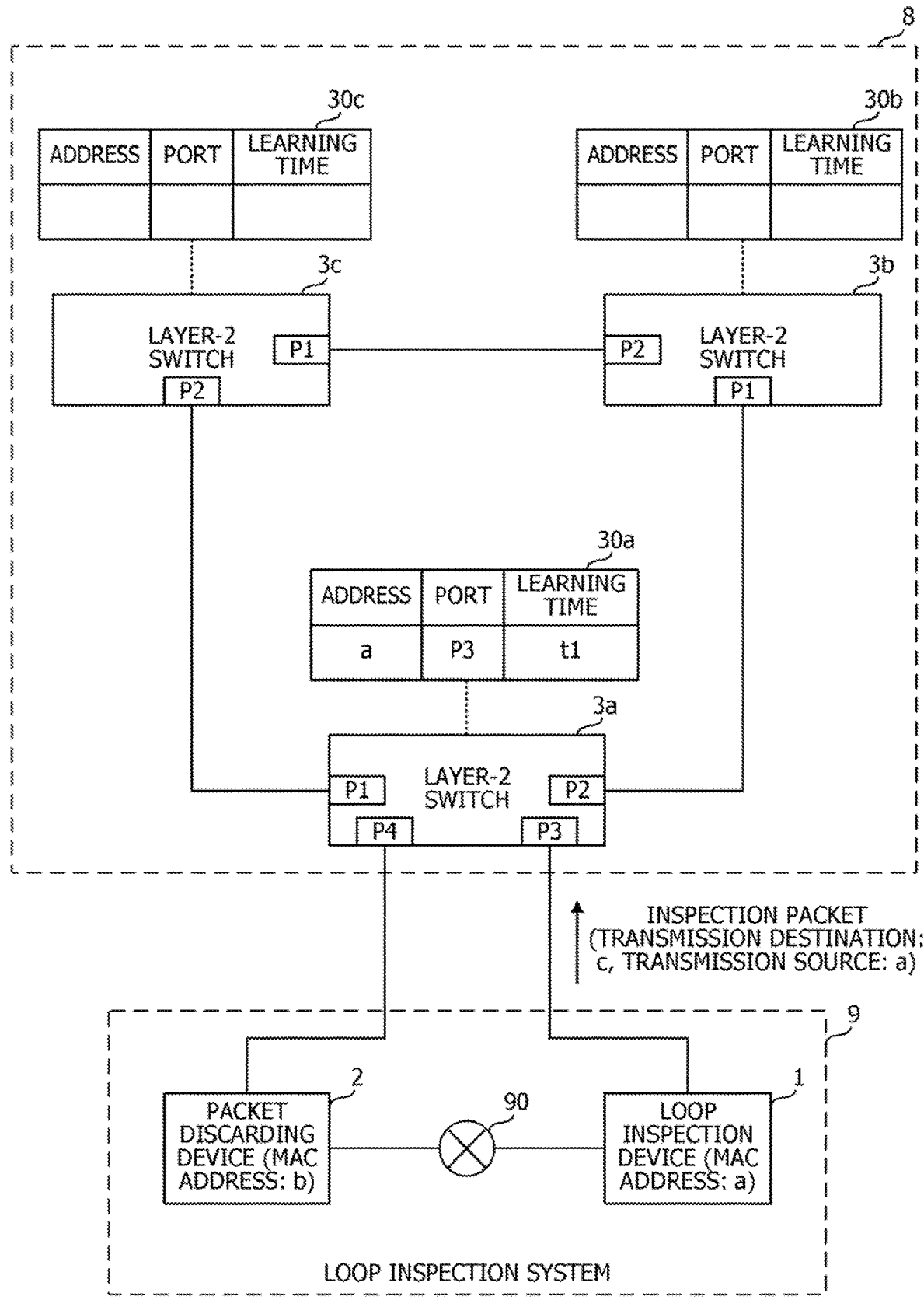
FIG. 2 is a diagram (part 1) illustrating an example of a loop inspection method.

As illustrated in FIG. 2, the loop inspection device 1 generates the inspection packet for detecting the loop path K and transmits the inspection packet to the layer-2 switch 3a. The transmission source address (see "transmission source") of the inspection packet is the MAC address "a" of the loop inspection device 1.

The transmission destination address of the inspection packet is an address "c" not learned by all the layer-2 switches 3a to 3c. For example, each of the layer-2 switches 3a to 3c in the network 8 does not learn the correspondence between the address "c" and the transfer destination device. The address "c" is an example of a first address.

The layer-2 switch 3a receives the inspection packet by the port P3. The layer-2 switch 3a registers the transmission source address "a" of the inspection packet, an identifier of the port P3, and a learning time "t1" in association with each other in the address learning table 30a.

Figure 3:
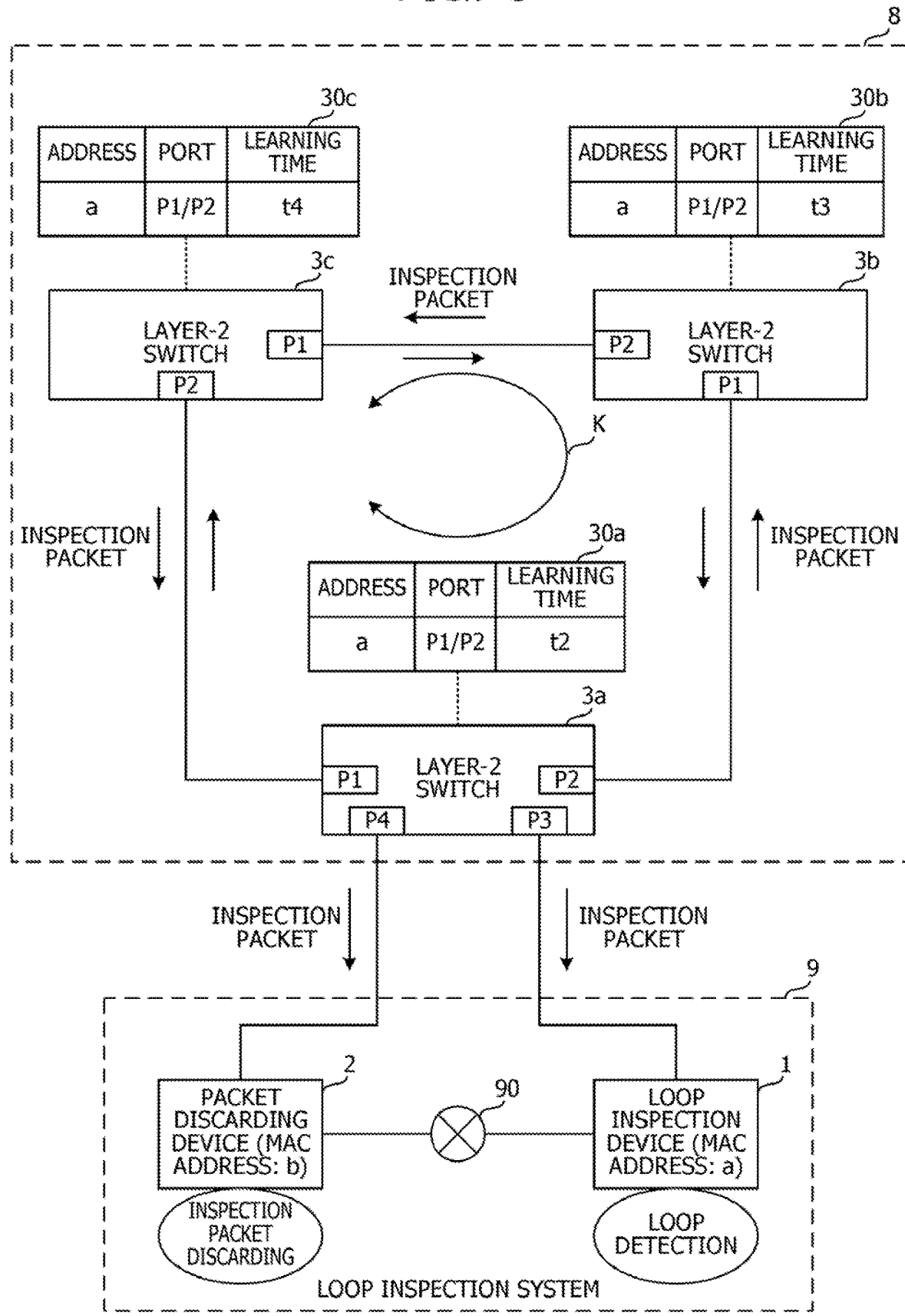
FIG. 3 is a diagram (part 2) illustrating the example of the loop inspection method.

As illustrated in FIG. 3, since the transmission destination address "c" of the inspection packet is not registered in the address learning table 30a, the layer-2 switch 3a transfers the inspection packet to the adjacent layer-2 switches 3b and 3c from the ports P1 and P2. When the inspection packet is received, the layer-2 switches 3b and 3c register the transmission source address "a" in the address learning tables 30b and 30c and transfer the inspection packet from the ports P2 and P1 to the adjacent layer-2 switches 3c and 3b, respectively, since the transmission destination address "c" of the inspection packet is not registered in the address learning table 30a.

Thus, each of the layer-2 switches 3a to 3c receives the inspection packet from the layer-2 switches 3a to 3c adjacent to each other by the ports P1 and P2. Accordingly, the inspection packet is transmitted and received between the ports P1 and P2 of each of the layer-2 switches 3a to 3c and flow along the loop path K in the network 8. Thus, the port of the ports P1 and P2 which receives the inspection packet last is registered in each of the address learning tables 30a to 30c so as to correspond to the transmission source address "a" of the inspection packet. Learning times t2, t3, and t4 at this time are also registered in the address learning tables 30a to 30c, respectively.

The layer-2 switch 3a transfers the inspection packet received by the ports P1 and P2 from the other layer-2 switches 3b and 3c to the loop inspection device 1 and the packet discarding device 2 from the ports P3 and P4, respectively. The loop inspection device 1 detects the loop path K by receiving the inspection packet from the layer-2 switch 3a. Unlike this example, when there is no loop path K in the network 8, since the inspection packet is not transmitted and received between the layer-2 switches 3b and 3c, the inspection packet is not returned to the loop inspection device 1.

The packet discarding device 2 discards the inspection packet received from the layer-2 switch 3a. However, since the transmission destination address of the inspection packet is not registered in each of the address learning tables 30a to 30c of the layer-2 switches 3a to 3c, the inspection packet continues to flow through the loop path K.

Figure 4:
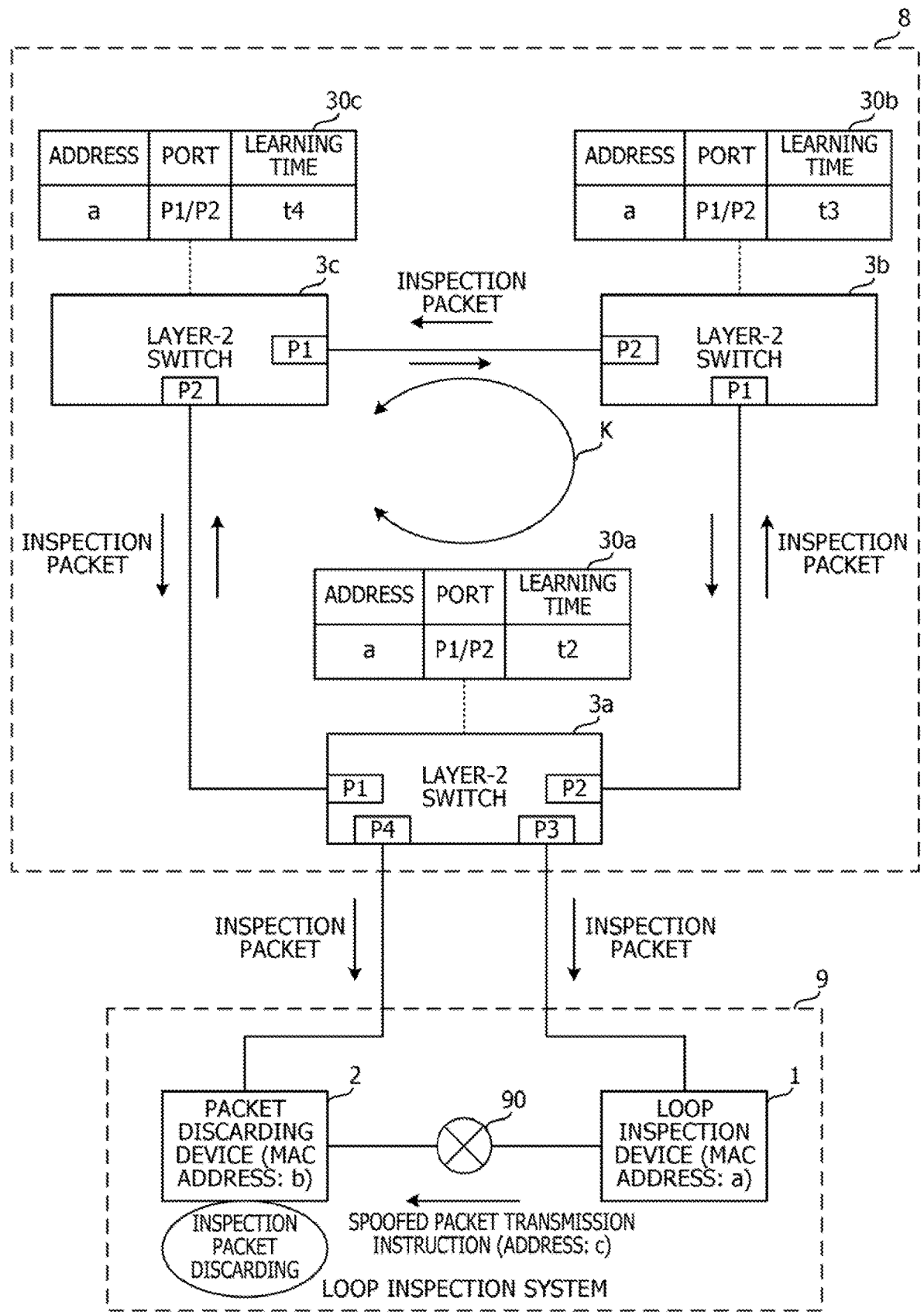
FIG. 4 is a diagram (part 3) illustrating the example of the loop inspection method.

Subsequently, as illustrated in FIG. 4, the loop inspection device 1 transmits an instruction to transmit a spoofed packet of which a transmission source address is set to the transmission destination address "c" of the inspection packet to the packet discarding device 2 via the cooperation network 90. The spoofed packet is a packet of which a transmission source address is spoofed not to the MAC address "b" of the packet discarding device 2 but to the transmission destination address "c" of the inspection packet. The spoofed packets are an example of setting packets of which the transmission source address is set to the address "c".

Figure 5:
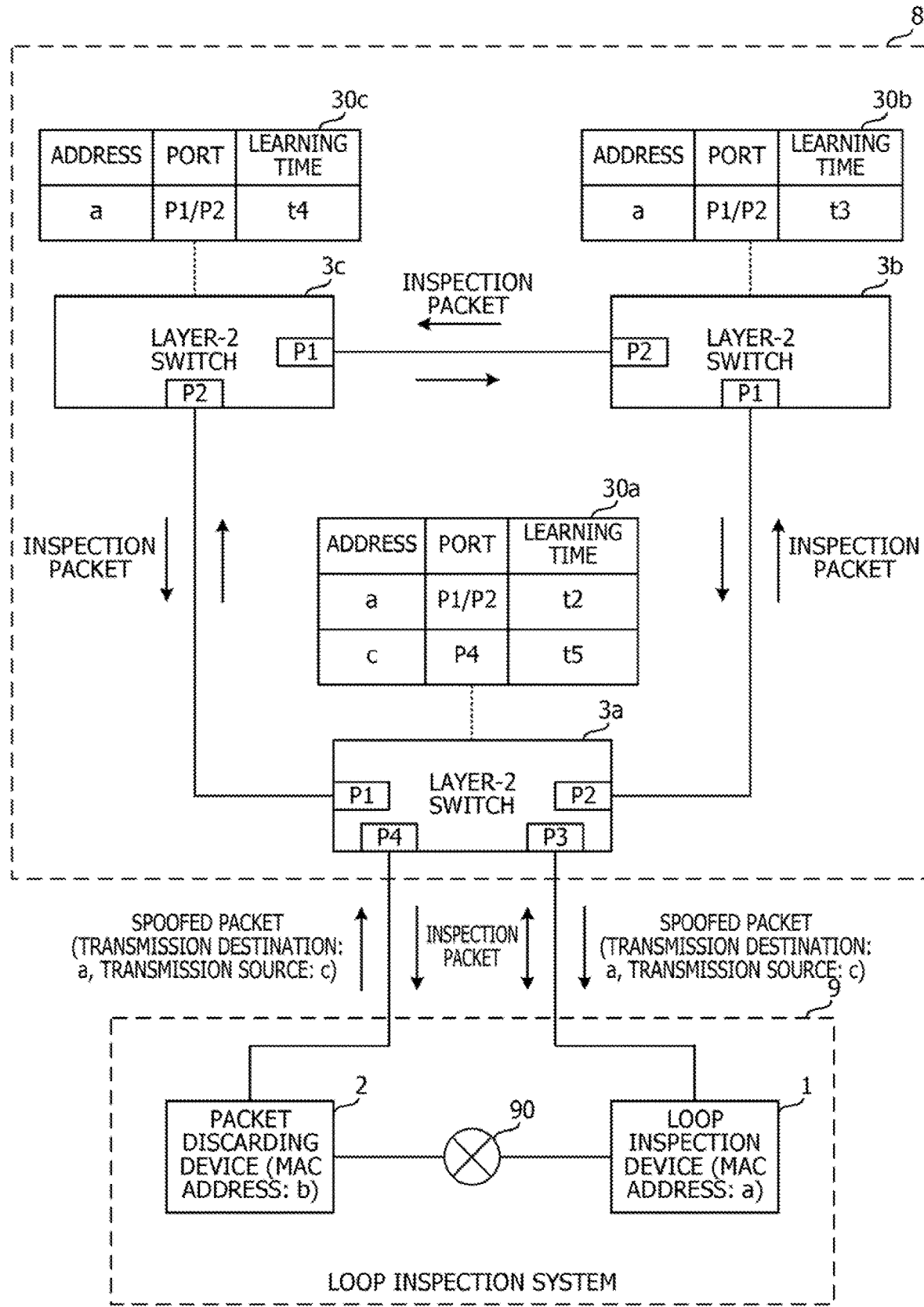
FIG. 5 is a diagram (part 4) illustrating the example of the loop inspection method.

Subsequently, as illustrated in FIG. 5, the packet discarding device 2 generates the spoofed packet and transmits the spoofed packet to the layer-2 switch 3a according to the transmission instruction from the loop inspection device 1. The packet discarding device 2 sets the transmission source address of the spoofed packet not to the MAC address "b" of the packet discarding device but to the transmission destination address "c" of the inspection packet instructed by the loop inspection device 1. Accordingly, the layer-2 switch 3a associates the transmission source address "c" of the spoofed packets and the port P4 which receives the spoofed packets with each other, and registers the transmission source address "c" and the port P4 together with a learning time t5 in the address learning table 30a.

Figure 6:
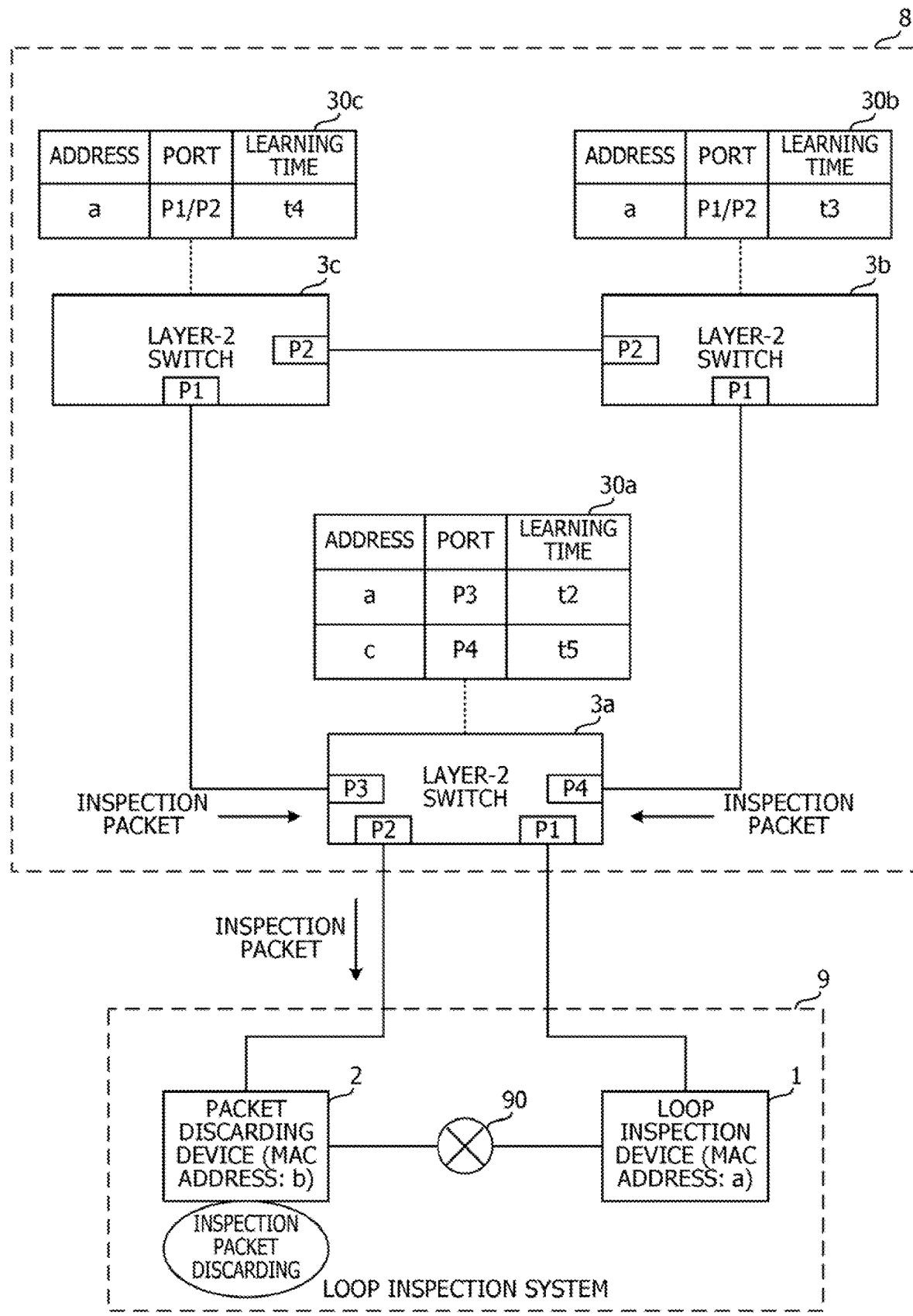
FIG. 6 is a diagram (part 5) illustrating the example of the loop inspection method.

Thus, the layer-2 switch 3a transfers the inspection packet to the packet discarding device 2 from the port P4 corresponding to the transmission destination address "c" of the inspection packet in the address learning table 30a. Accordingly, as illustrated in FIG. 6, since each inspection packet continuing to flow through the loop path K reaches the packet discarding device 2 from the layer-2 switch 3a, the inspection packet is removed from the network 8. The packet discarding device 2 discards the inspection packet transferred from the layer-2 switch 3a.

The packet discarding device 2 sets the MAC address "a" of the loop inspection device 1 as the transmission destination address of the spoofed packet. In the address learning table 30a of the layer-2 switch 3a, since the inspection packet is continuously transmitted from the loop inspection device 1, the transmission source address "a" of the inspection packet and the port P3 which receives the inspection packet are associated with each other and are registered together with a learning time after the retransmission of the inspection packet in the address learning table 30a (not illustrated).

Thus, the layer-2 switch 3a transfers the spoofed packet to the loop inspection device 1 from the port P3 corresponding to the transmission destination address "a" in the spoofed packet from the address learning table 30a. The loop inspection device 1 discards the spoofed packet. The address "a" is an example of a second address.

As described above, the loop inspection device 1 transmits the inspection packet of which the transmission destination address is the address "c" not learned by each of the layer-2 switches 3a to 3c to the network 8, and determines whether or not the packet received from the network 8 matches the inspection packet. The loop inspection device 1 detects the loop path K between the layer-2 switches 3a to 3c based on the determination result of the packet and instructs the packet discarding device 2 to transmit the spoofed packet of which the transmission source address is set to the address "c" to the network 8.

On the other hand, the packet discarding device 2 acquires the address "c" from the transmission instruction of the spoofed packet from the loop inspection device 1, generates the spoofed packet of which the transmission source address is set to the address "c", and transmits the spoofed packet to the network 8 after the loop inspection device 1 transmits the inspection packet to the network 8.

Thus, the layer-2 switch 3a registers the transmission source address "c" of the spoofed packet in association with the port P2 coupled to the packet discarding device 2 in the address learning table 30a. Thus, the inspection packet continuing to flow through the loop path K between the layer-2 switches 3a to 3c is transferred from the layer-2 switch 3a to the packet discarding device 2. Accordingly, since the inspection packet is removed from the network 8, the pressure on the communication band due to the inspection packet is relieved.

[Configuration of Loop Inspection Device]

Figure 7:
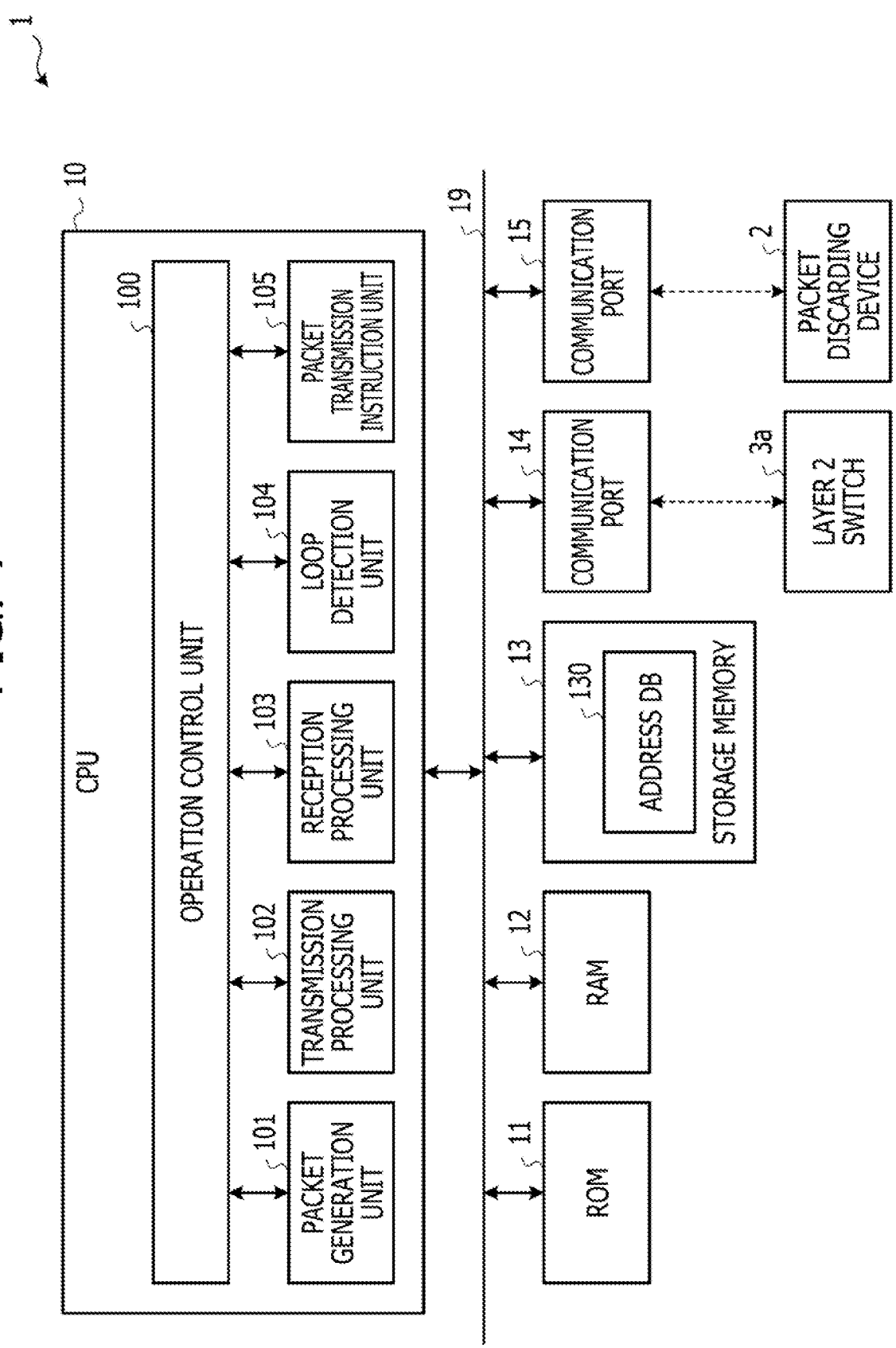
FIG. 7 is a configuration diagram illustrating an example of a loop inspection device.

FIG. 7 is a configuration diagram illustrating an example of the loop inspection device 1. The loop inspection device 1 includes a central processing unit (CPU) 10, a read-only memory (ROM) 11, a random-access memory (RAM) 12, a storage memory 13, and communication ports 14 and 15. The CPU 10 is coupled to the ROM 11, the RAM 12, the storage memory 13, and the communication ports 14 and 15 via a bus 19 so as to be able to input and output signals to and from each other.

The ROM 11 stores a program for driving the CPU 10. The RAM 12 functions as a working memory for the CPU 10. The communication ports 14 and 15 are, for example, network interface cards (NICs), and transmit and receive packets to and from the layer-2 switch 3a and the packet discarding device 2, respectively. The CPU 10 communicates with the layer-2 switch 3a and the packet discarding device 2 via the communication ports 14 and 15, respectively.

When the program is read from the ROM 11, the CPU 10 forms, as functions, an operation control unit 100, a packet generation unit 101, a transmission processing unit 102, a reception processing unit 103, a loop detection unit 104, and a packet transmission instruction unit 105. The storage memory 13 stores an address database (DB) 130 in which the address "c" is registered.

The operation control unit 100 controls the entire operation of the loop inspection device 1. The operation control unit 100 instructs the packet generation unit 101, the transmission processing unit 102, the reception processing unit 103, the loop detection unit 104, and the packet transmission instruction unit 105 to operate according to a predetermined sequence.

The packet generation unit 101 generates the inspection packet. At this time, the packet generation unit 101 reads out the address "c" from the address DB and sets the address "c" as the transmission destination address of the inspection packet.

The transmission processing unit 102 is an example of a first transmission unit, and transmits the inspection packet to the layer-2 switch 3a via the communication port 14. The reception processing unit 103 is an example of a first reception unit, and receives the packet from the layer-2 switch 3a via the communication port 14.

The loop detection unit 104 is an example of a determination unit, and determines whether or not the packet (received packet) received by the reception processing unit 103 matches the inspection packet. The loop detection unit 104 detects the loop path K between the layer-2 switches 3a to 3c based on the determination result. The loop detection unit 104 acquires the received packet from the reception processing unit 103 via the operation control unit 100 and compares the received packet with the inspection packet.

As an example, when the transmission source address of the received packet is the transmission source address "a" of the inspection packet, the loop detection unit 104 determines that the received packet matches the inspection packet and detects the loop path K. When the transmission source address of the received packet is not "a", the loop detection unit 104 determines that the received packet does not match the inspection packet and does not detect the loop path K.

After the inspection packet is transmitted to the layer-2 switch 3a, the packet transmission instruction unit 105 instructs the packet discarding device 2 to transmit the spoofed packet of which the transmission source address is set to the address "c" to the layer-2 switch 3a. The packet transmission instruction unit 105 reads out the address "c" from the address DB 130, includes the address "c" in the transmission instruction of the spoofed packet, and transmits the transmission instruction to the packet discarding device 2 via the communication port 15. The packet transmission instruction unit 105 may transmit the transmission instruction to the packet discarding device 2 before the inspection packet is transmitted to the layer-2 switch 3a. In this case, the packet transmission instruction unit 105 also instructs a transmission timing of the spoofed packet to the packet discarding device 2 such that the packet discarding device 2 may transmit the spoofed packet after the transmission of the inspection packet.

[Configuration of Packet Discarding Device]

Figure 8:
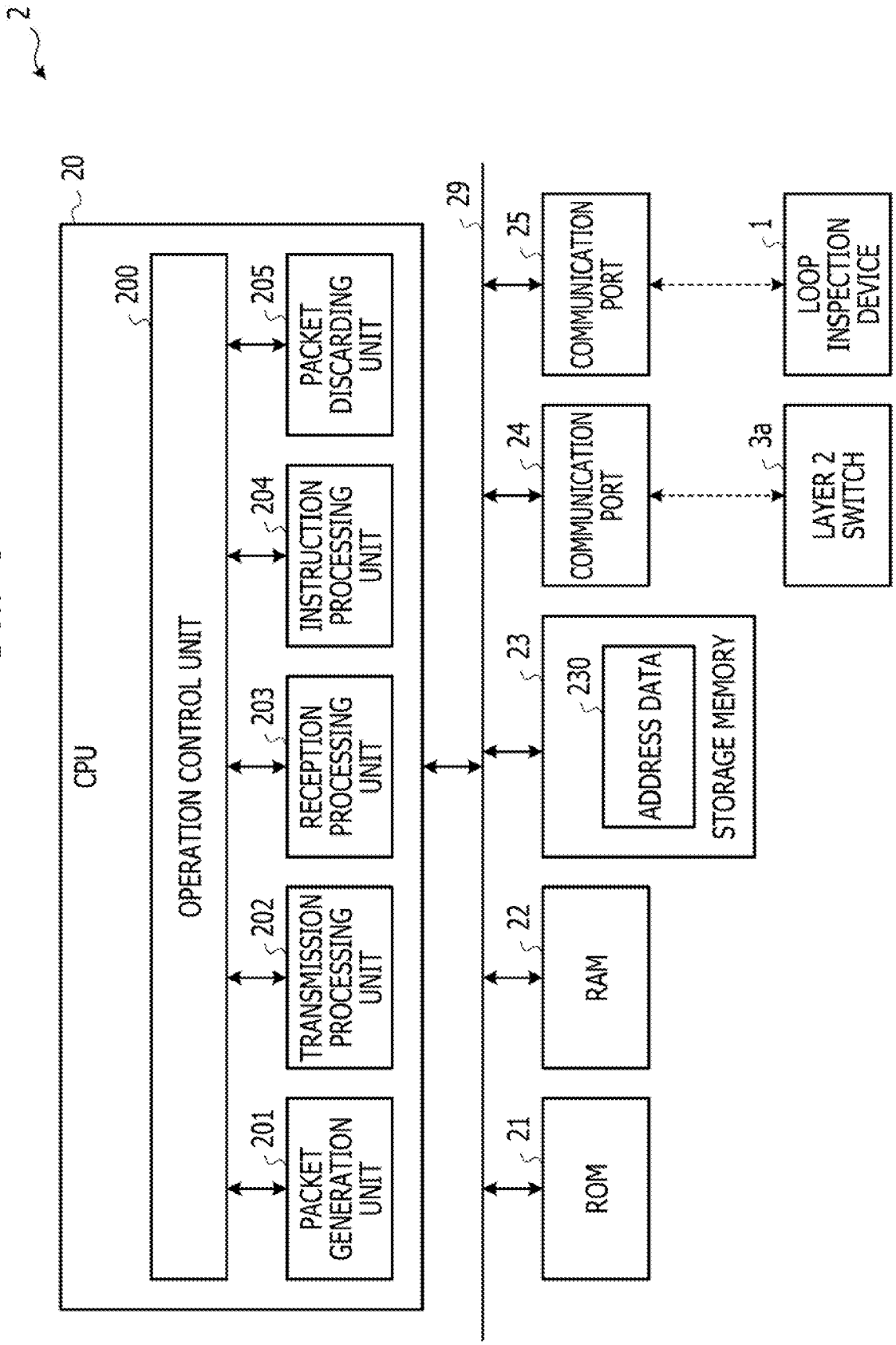
FIG. 8 is a configuration diagram illustrating an example of a packet discarding device.

FIG. 8 is a configuration diagram illustrating an example of the packet discarding device 2. The packet discarding device 2 includes a CPU 20, a ROM 21, a RAM 22, a storage memory 23, and communication ports 24 and 25. The CPU 20 is coupled to the ROM 21, the RAM 22, the storage memory 23, and the communication ports 24 and 25 via a bus 29 to be able to input and output signals to and from each other.

The ROM 21 stores a program for driving the CPU 20. The RAM 22 functions as a working memory of the CPU 20. The communication ports 24 and 25 are, for example, NICs, and transmit and receive the packet to and from the layer-2 switch 3a and the loop inspection device 1, respectively. The CPU 20 communicates with the layer-2 switch 3a and the loop inspection device 1 via the communication ports 24 and 25, respectively.

When the program is read from the ROM 21, the CPU 20 forms, as functions, an operation control unit 200, a packet generation unit 201, a transmission processing unit 202, a reception processing unit 203, an instruction processing unit 204, and a packet discarding unit 205. The storage memory 23 stores address data 230 of the transmission source address of the spoofed packet.

The operation control unit 200 controls the entire operation of the packet discarding device 2. The operation control unit 200 instructs the packet generation unit 201, the transmission processing unit 202, the reception processing unit 203, the instruction processing unit 204, and the packet discarding unit 205 to operate according to a predetermined sequence.

The instruction processing unit 204 receives the transmission instruction of the spoofed packet from the loop inspection device 1 via the communication port 25. The instruction processing unit 204 acquires the address "c" from the transmission instruction and stores the address "c", as the address data 230, in the storage memory 23. The instruction processing unit 204 is an example of an acquisition unit.

The packet generation unit 201 reads out the address "c" of the address data 230 from the storage memory 23. The packet generation unit 201 generates the spoofed packet of which the transmission source address is set to the address "c". In order to register the address "c" in the address learning table 30c of the layer-2 switch 3a so as to correspond to the port P4, the packet generation unit 201 spoofs the transmission source address of the spoofed packet to the address "c" instead of the MAC address "b" of the packet discarding device 2. The packet generation unit 201 is an example of a generation unit.

The transmission processing unit 202 is an example of a second transmission unit, and transmits the spoofed packet to the layer-2 switch 3a after the loop inspection device 1 transmits the inspection packet of which the transmission destination address is set to the address "c" to the layer-2 switch 3a. When the transmission timing is indicated by the transmission instruction of the spoofed packet from the loop inspection device 1, the transmission processing unit 202 transmits the spoofed packet according to the transmission timing.

The reception processing unit 203 is an example of a second reception unit, and receives the inspection packet from the layer-2 switch 3a via the communication port 24 after the transmission of the spoofed packet. At this time, the layer-2 switch 3a transfers the inspection packet having the transmission destination address "c" to the packet discarding device 2 from the port P4 according to the address learning table 30c. Accordingly, the reception processing unit 203 may remove the inspection packet flowing through the loop path K from the network 8.

The packet discarding unit 205 discards the inspection packet received by the reception processing unit 203. The discarding of the inspection packet may be performed by another device.

[Operation of Loop Inspection Device]

Figure 9:
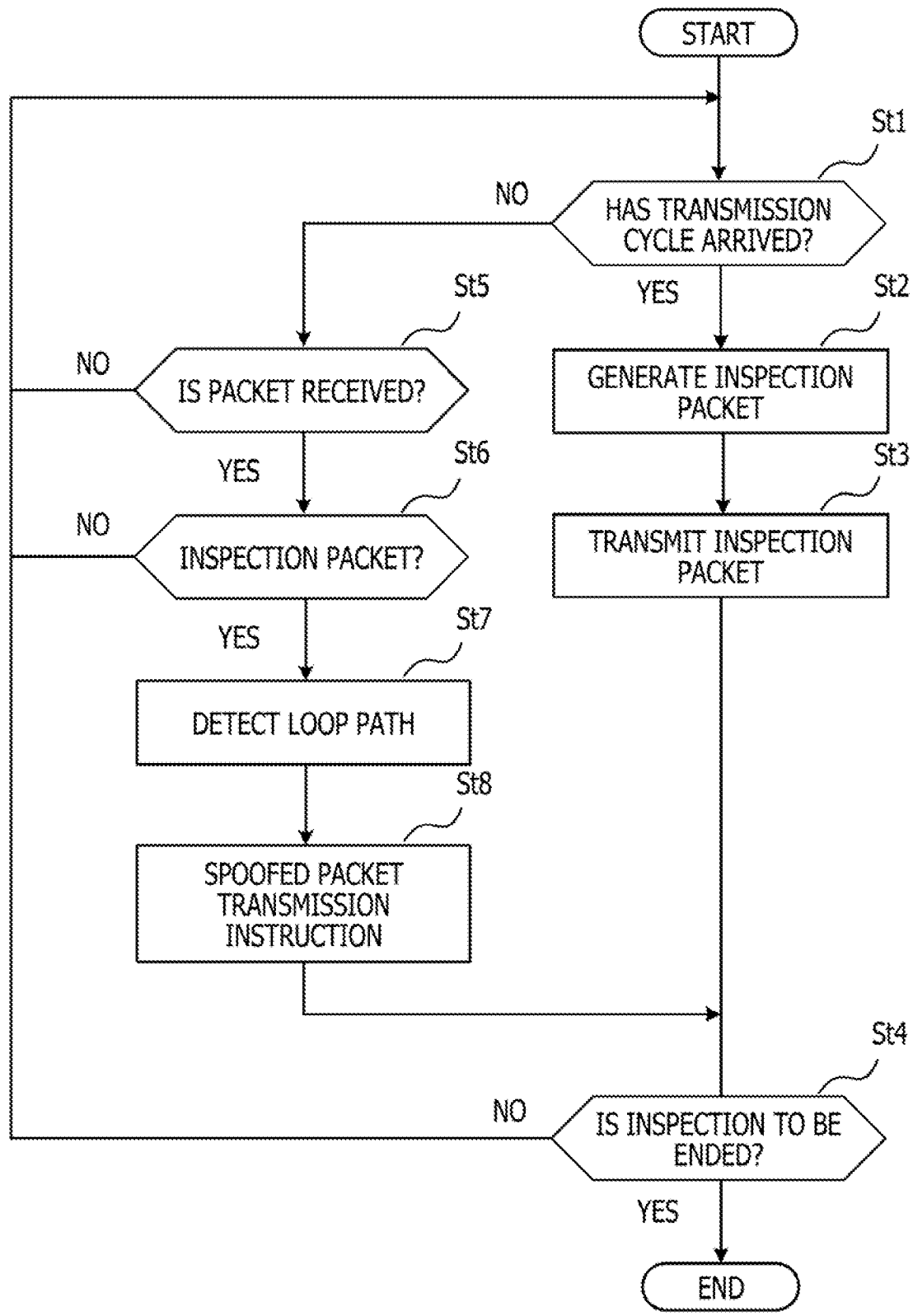
FIG. 9 is a flowchart illustrating an example of an operation of the loop inspection device.

FIG. 9 is a flowchart illustrating an example of an operation of the loop inspection device 1. The operation control unit 100 determines whether or not a transmission cycle of the inspection packet has arrived (operation St1), and when the transmission cycle has arrived (Yes of operation St1), the packet generation unit 101 generates the inspection packet according to an instruction from the operation control unit 100 (operation St2). At this time, the packet generation unit 101 acquires the transmission destination address "c" of the inspection packet from the address DB 130.

Subsequently, the transmission processing unit 102 transmits the inspection packet to the layer-2 switch 3a from the communication port 14 according to an instruction from the operation control unit 100 (operation St3). At this time, since the transmission destination address "c" of the inspection packet is not registered in each of the learning tables 30a to 30c of the layer-2 switches 3a to 3c in the network 8, the inspection packet continues to flow through the loop path K.

Subsequently, the operation control unit 100 determines whether or not the loop inspection is to be ended based on, for example, an instruction of a user (operation St4). When the loop inspection is to be ended (Yes of operation St4), the operation control unit 100 ends the processing. When the loop inspection is to be continued (No of operation St4), each processing in and after operation St1 is executed again.

When the transmission cycle has not arrived (No of operation St1), the reception processing unit 103 determines whether or not a new packet is received from the layer-2 switch 3*a* via the communication port 14 according to an instruction from the operation control unit 100 (operation St5). When the packet is not received (No of operation St5), each processing in and after operation St1 is executed again.

When the packet is received (Yes of operation St5), the loop detection unit 104 determines whether or not the received packet matches the inspection packet according to an instruction from the operation control unit 100 (operation St6). The loop detection unit 104 determines whether or not the transmission destination address of the received packet matches the transmission destination address "c" of the inspection packet. When the received packet does not match the inspection packet (No of operation St6), each processing in and after operation St1 is executed again.

When the received packet matches the inspection packet (Yes of operation St6), the loop detection unit 104 detects the loop path K in the network 8 (operation St7). At this time, the loop detection unit 104 notifies the user of the detection of the loop path K. After the loop path K is detected, the loop detection unit 104 discards the received packet.

Subsequently, the packet transmission instruction unit 105 transmits the transmission instruction of the spoofed packet to the packet discarding device 2 via the communication port 15 according to an instruction from the operation control unit 100 (operation St8). At this time, the packet transmission instruction unit 105 reads out the address "c" from the address DB 130 and includes the address "c" in the transmission instruction. Accordingly, the transmission destination address "c" of the inspection packet is notified from the loop inspection device 1 to the packet discarding device 2. In this way, the loop inspection device 1 operates.

Although the loop detection unit 104 identifies the inspection packet based on the transmission destination address "c" of the received packet in the processing of operation St6 described above, the present disclosure is not limited thereto, and the inspection packet may be identified based on a type field as described below.

Figure 10:
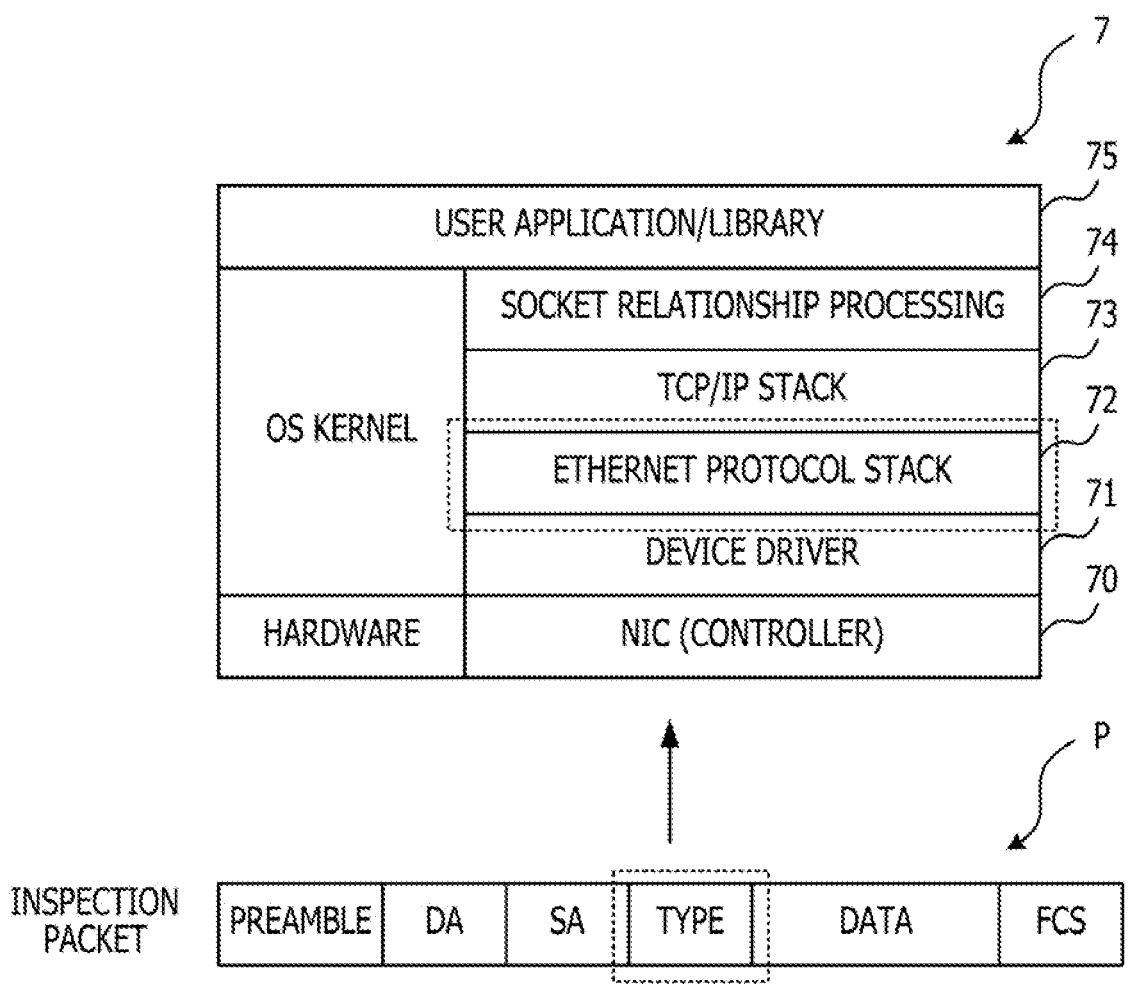
FIG. 10 is a diagram illustrating an example of processing of an inspection packet using a type field.

FIG. 10 is a diagram illustrating an example of processing of the inspection packet using the type field. A reference sign P indicates an example of a configuration of the inspection packet, and a reference sign 7 indicates an example of a configuration of packet processing.

The inspection packet includes a preamble, a destination address (DA) of the transmission destination address, a source address (SA) of the transmission source address, a type indicating a type of a protocol, data, and a frame check sequence (FCS) for detecting a data error. For example, an identification code indicating the loop inspection or an identification code of the existing protocol that is not substantially used is assigned to the type. Examples of the identification code of such an existing protocol include 0101h to 01FFh (in hexadecimal notation, the same applies below) for experiments, 809Bh of AppleTalk, 8137h of Internet Packet Exchange (IPX), and the like.

The configuration of the packet processing includes a controller (NIC) 70, a device driver 71, an Ethernet protocol stack 72, a Transmission Control Protocol (TCP)/Internet Protocol (IP) stack 73, socket relationship processing 74, and a user application/library 75. The controller (NIC) 70 is hardware, and the device driver 71, the Ethernet protocol stack 72, the TCP/IP stack 73, and the socket relationship processing 74 are implemented in an operating system (OS) kernel.

The inspection packet is not used for normal communication other than the loop inspection. Thus, not only the loop inspection device 1 and the packet discarding device 2 but also another communication device (a router or the like) coupled to the layer-2 switches 3*a* to 3*c* discard the inspection packet. Processing of discarding the inspection packet may be performed by the Ethernet protocol stack 72, the TCP/IP stack 73, and the socket relationship processing 74.

In order to suppress a load of the processing of discarding the inspection packet, it is desirable to use processing in a layer as low as possible. Thus, when an identification code indicating the inspection packet is set in the type field of the inspection packet, since the discarding processing by the Ethernet protocol stack 72 in the lowest layer may be performed, a load of the discarding processing is suppressed.

Accordingly, when the type field of the received packet is a predetermined identification code, the loop detection unit 104 may determine that the received packet matches the inspection packet.

The loop detection unit 104 may identify the inspection packet based on the transmission source address (SA) of the received packet. When the transmission source address of the received packet is the transmission source address "a" of the inspection packet, the loop detection unit 104 determines that the received packet matches the inspection packet.

As described above, the loop detection unit 104 determines whether or not the received packet matches the inspection packet based on the transmission destination address, the transmission source address, or the type field of the received packet. Thus, the loop detection unit 104 may perform the determination with a lower load than when the determination is performed based on all the received packets.

[Operation of Packet Discarding Device]

Figure 11:
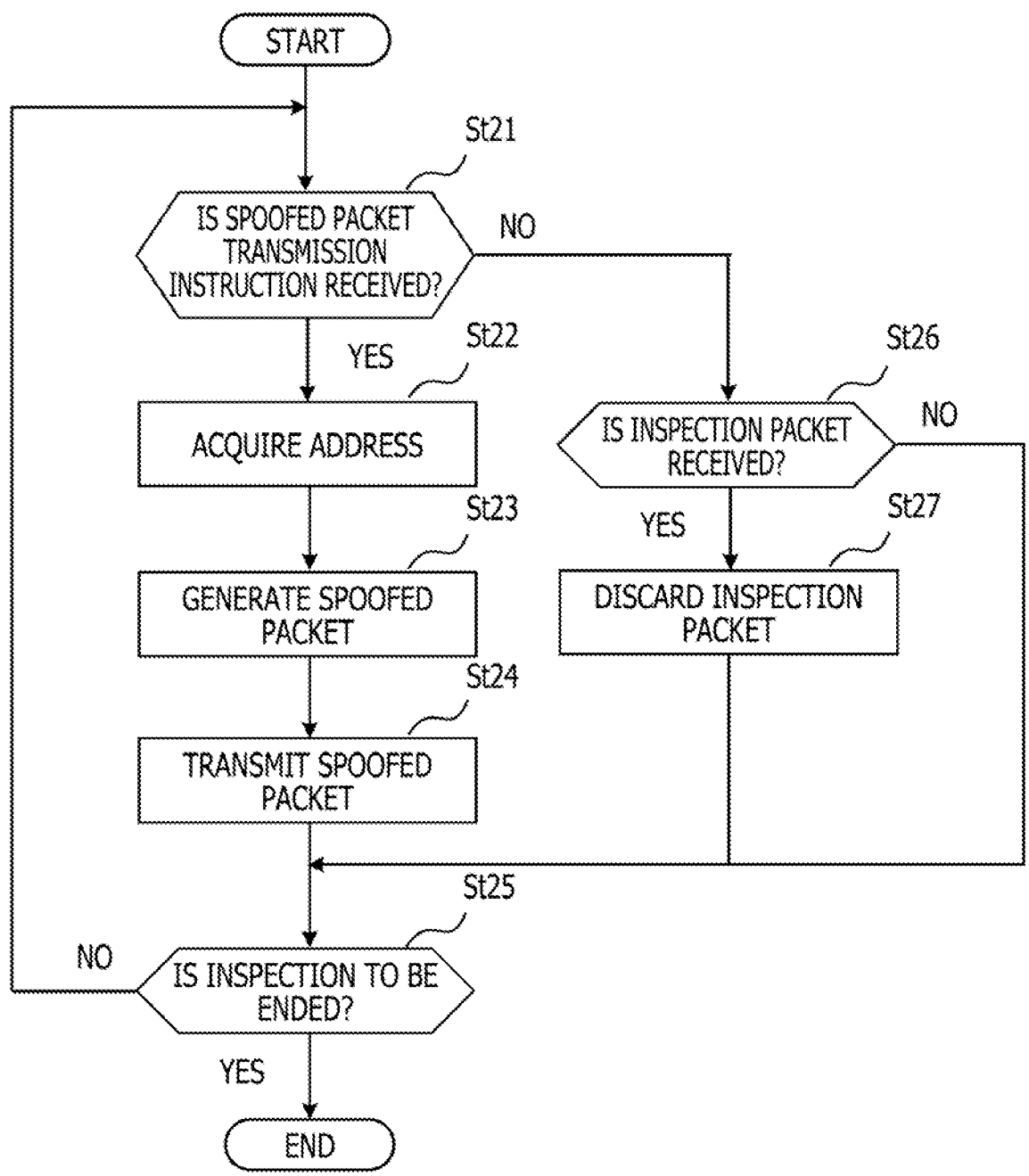
FIG. 11 is a flowchart illustrating an example of an operation of the packet discarding device.

FIG. 11 is a flowchart illustrating an example of an operation of the packet discarding device 2. The instruction processing unit 204 determines whether or not the transmission instruction of the spoofed packet is received from the loop inspection device 1 via the communication port 25 (operation St21). When the transmission instruction is received (Yes of operation St21), the instruction processing unit 204 acquires the address "c" from the transmission instruction (operation St22). At this time, the instruction processing unit 204 stores the address "c", as the address data 230, in the storage memory 23.

Subsequently, the packet generation unit 201 generates the spoofed packet of which the transmission source address is set to the address "c" according to an instruction from the operation control unit 200 (in operation St23). At this time, the packet generation unit 201 generates the spoofed packet with the MAC address "a" of the loop inspection device 1 as the transmission destination address. Thus, the spoofed packet is transferred to the loop inspection device 1 without being transferred from the layer-2 switch 3*a* to the layer-2 switches 3*b* and 3*c*. Thus, a load of the transfer processing of the layer-2 switches 3*b* and 3*c* may be suppressed.

Subsequently, the transmission processing unit 202 transmits the spoofed packet to the layer-2 switch 3*a* via the communication port 24 according to an instruction from the operation control unit 200 (operation St24). The transmission of the spoofed packet is executed by the transmission of the inspection packet and the detection of the loop path K. Accordingly, the inspection packet continuously flowing through the loop path K reaches the packet discarding device 2 via the layer-2 switch 3a.

Subsequently, the operation control unit 200 determines whether or not the loop inspection is to be ended based on, for example, an instruction of the user (operation St25). When the loop inspection is to be ended (Yes of operation St25), the operation control unit 200 ends the processing. When the loop inspection is to be continued (No of operation St25), each processing in and after operation St21 is executed again.

When the instruction processing unit 204 does not receive the transmission instruction (No of operation St21), the reception processing unit 203 determines whether or not a new inspection packet is received from the layer-2 switch 3a via the communication port 24 according to an instruction from the operation control unit 200 (operation St26). At this time, as described above, the inspection packet is identified based on the transmission destination address, the transmission source address, or the type field of the packet received by the reception processing unit 203. When the inspection packet is not received (No of operation St26), the processing in operation St25 is executed.

When the inspection packet is received (Yes of operation St26), the packet discarding unit 205 discards the inspection packet (operation St27). Thereafter, the processing in operation St25 is executed. In this way, the packet discarding device 2 operates.

[Operation of Layer-2 Switch]

Figure 12:
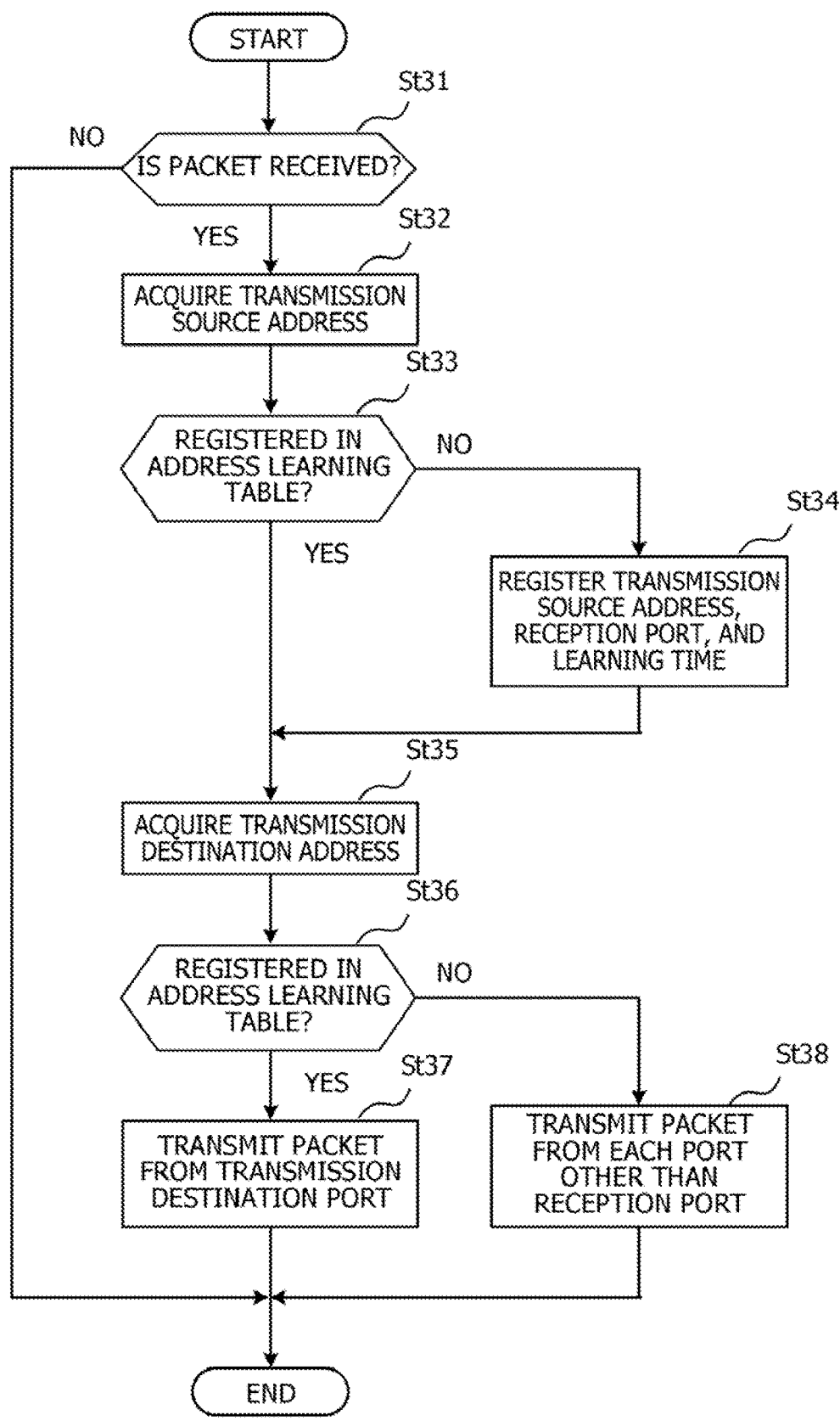
FIG. 12 is a flowchart illustrating an example of packet reception processing of a layer-2 switch.

FIG. 12 is a flowchart illustrating an example of packet reception processing of the layer-2 switches 3a to 3c. This processing is executed in cycles. In the following description, the ports of the layer-2 switches 3a to 3c are collectively referred to as the "ports P1 to P4", but the ports P3 and P4 are provided only in the layer-2 switch 3a as described above.

The layer-2 switches 3a to 3c determine whether or not a new packet is received by the ports P1 to P4 (operation St31). When the packet is not received (No of operation St31), the processing is ended. When the packet is received (Yes of operation St31), the layer-2 switches 3a to 3c acquire the transmission source address from the packet (operation St32).

Subsequently, the layer-2 switches 3a to 3c determine whether or not the transmission source address is registered in the address learning tables 30a to 30c (for example, whether or not the transmission source address is learned) (operation St33). When the transmission source address is not registered (No of operation St33), the layer-2 switches 3a to 3c register the transmission source address, the ports (reception ports) P1 to P4 that receive the packet, and the learning times in the address learning tables 30a to 30c in association with each other (operation St34).

When the transmission source address is registered (Yes of operation St33), the layer-2 switches 3a to 3c acquire the transmission destination address from the packet (operation St35). Subsequently, the layer-2 switches 3a to 3c determine whether or not the transmission destination address is registered in the address learning tables 30a to 30c (for example, whether or not the transmission destination address is learned) (operation St36).

When the transmission destination address is not registered (No of operation St36), the layer-2 switches 3a to 3c transmit the packet from each of the ports P1 to P4 other than the reception ports P1 to P4 (operation St38). For example, when the transmission destination address is not learned, the layer-2 switches 3a to 3c broadcast the packet.

When the transmission destination address is registered (Yes of operation St36), the layer-2 switches 3a to 3c transmit the packet from the ports (transmission ports) P1 to P4 corresponding to the transmission destination address (operation St37). Accordingly, the packet is transferred to a transmission destination device. In this way, the packet reception processing is executed.

Figure 13:
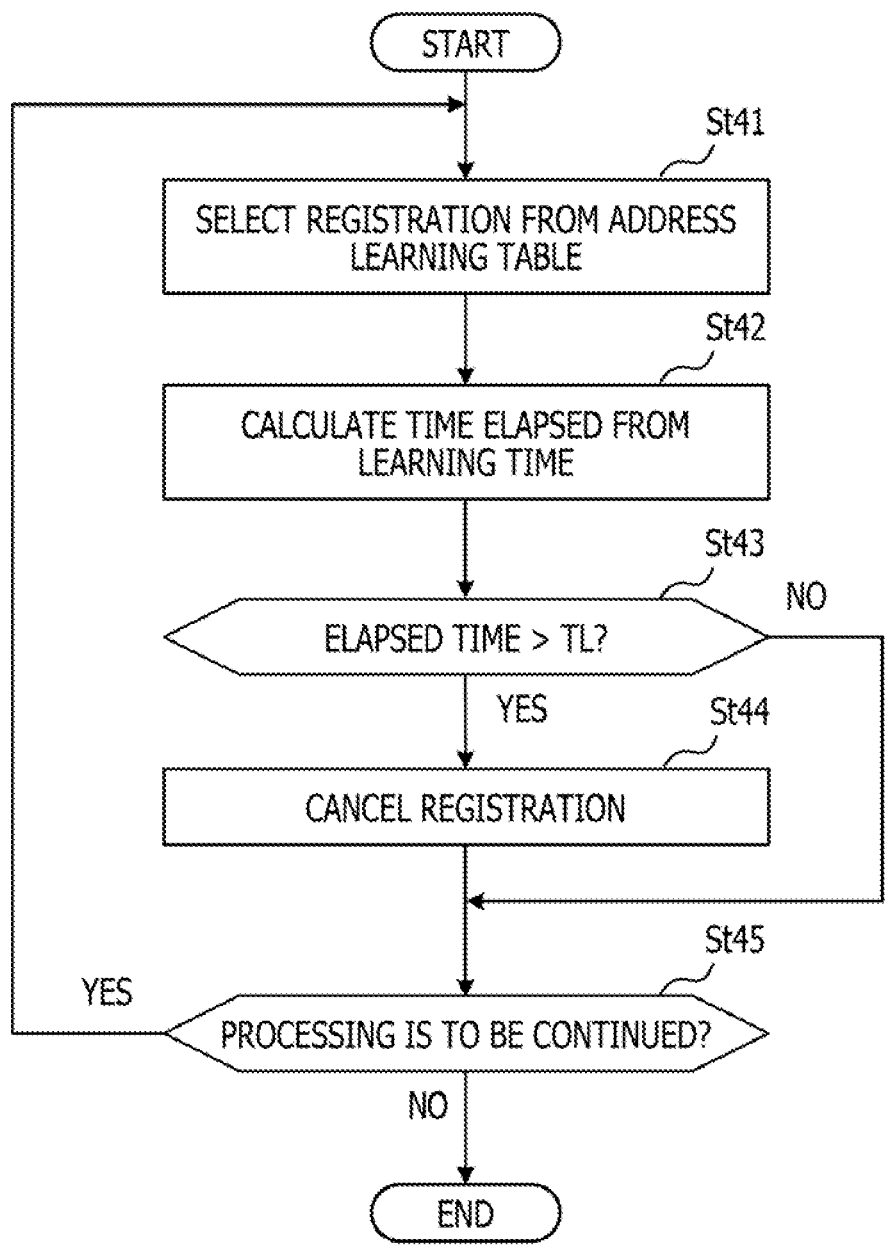
FIG. 13 is a flowchart illustrating an example of registration cancellation processing of an address learning table.

FIG. 13 is a flowchart illustrating an example of registration cancellation processing of the address learning tables 30a to 30c. In this processing, the layer-2 switches 3a to 3c cancel the registered content for which a predetermined time elapses from the learning time from the address learning tables 30a to 30c.

The layer-2 switches 3a to 3c select the registration of the address, the port, and the learning time from the address learning tables 30a to 30c (operation St41). Subsequently, the layer-2 switches 3a to 3c calculate a time elapsed from the learning time (operation St42).

The layer-2 switches 3a to 3c compare the elapsed time with a cache period TL of the address learning tables 30a to 30c (operation St43). When the elapsed time is longer than the cache period TL (Yes of operation St43), the layer-2 switches 3a to 3c cancel the registration from the address learning tables 30a to 30c (operation St44). When the elapsed time is equal to or shorter than the cache period TL (No of operation St43), the layer-2 switches 3a to 3c maintain the registration of the address learning tables 30a to 30c without cancelling the registration.

Subsequently, the layer-2 switches 3a to 3c determine whether or not this processing is to be continued based on, for example, an instruction of the user (operation St45). When the processing is to be stopped (No of operation St45), the layer-2 switches 3a to 3c end the processing. When the processing is to be continued (Yes of operation St45), the layer-2 switches 3a to 3c select another registration from the address learning tables 30a to 30c (operation St41) and execute each processing in and after operation St42 again.

In this way, each of the layer-2 switches 3a to 3c retains the registration of the address, the port, and the learning time in the address learning tables 30a to 30c for the predetermined cache period TL from the learning time. Thus, the layer-2 switch 3a retains the address "c" in the address learning table 30a for the cache period TL after the spoofed packet is received from the packet discarding device 2.

However, when the inspection packet is transmitted to the layer-2 switch 3a before the cache period TL elapses from the learning time of the address "c", since the inspection packet is transferred to the packet discarding device 2 without being returned to the loop inspection device 1, the loop inspection device 1 may not detect the loop path K. Thus, the loop inspection device 1 sets the transmission cycle of the inspection packet to be longer than the cache period TL as follows.

Figure 14:
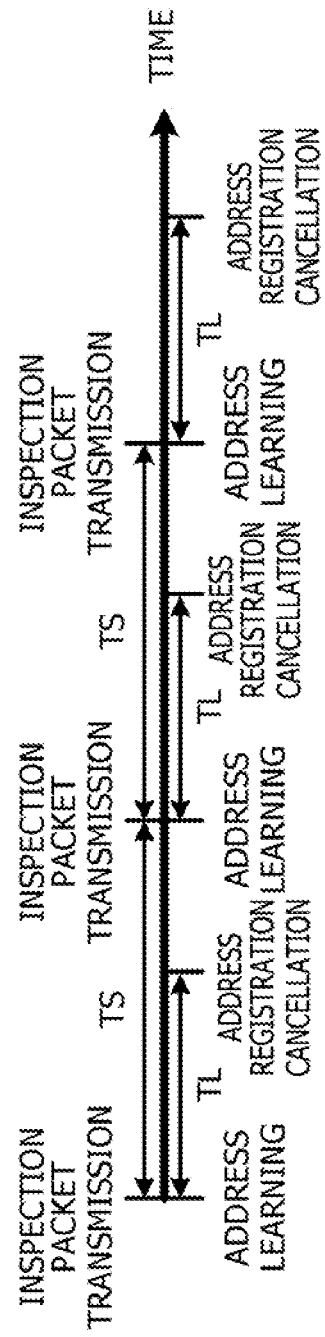
FIG. 14 is a time chart illustrating an example of a relationship between a transmission cycle of the inspection packet and a cache period.

FIG. 14 is a time chart illustrating an example of a relationship between a transmission cycle TS of the inspection packet and the cache period TL. The loop inspection device 1 transmits the inspection packet to the layer-2 switch 3a at a predetermined transmission cycle TS.

After the inspection packet is transmitted, the layer-2 switch 3a registers the address "c" in the address learning table 30a by receiving the spoofed packet from the packet discarding device 2 ("address learning"). The layer-2 switch 3a cancels the registration of the address "c" from the address learning table 30a when the cache period TL elapses after the registration of the address "c" ("address registration cancellation").

Since the learning time of the address "c" is regarded as being substantially the same as the transmission time of the inspection packet, when the transmission cycle of the inspection packet is longer than the cache period TL, the transmission time of each inspection packet is after the registration of the address "c" is cancelled from the address learning table 30a.

As described above, the transmission processing unit 102 of the loop inspection device 1 transmits the inspection packet at the transmission cycle TS longer than the cache period TL. Thus, even though the inspection packet is repeatedly transmitted by using the same address "c" as the transmission destination address, the transmission processing unit 102 may detect the loop path K.

The transmission processing unit 102 may transmit the inspection packet at the transmission cycle TS shorter than the cache period TL, and may change the transmission destination address of the inspection packet for each transmission cycle TS.

Figure 15:
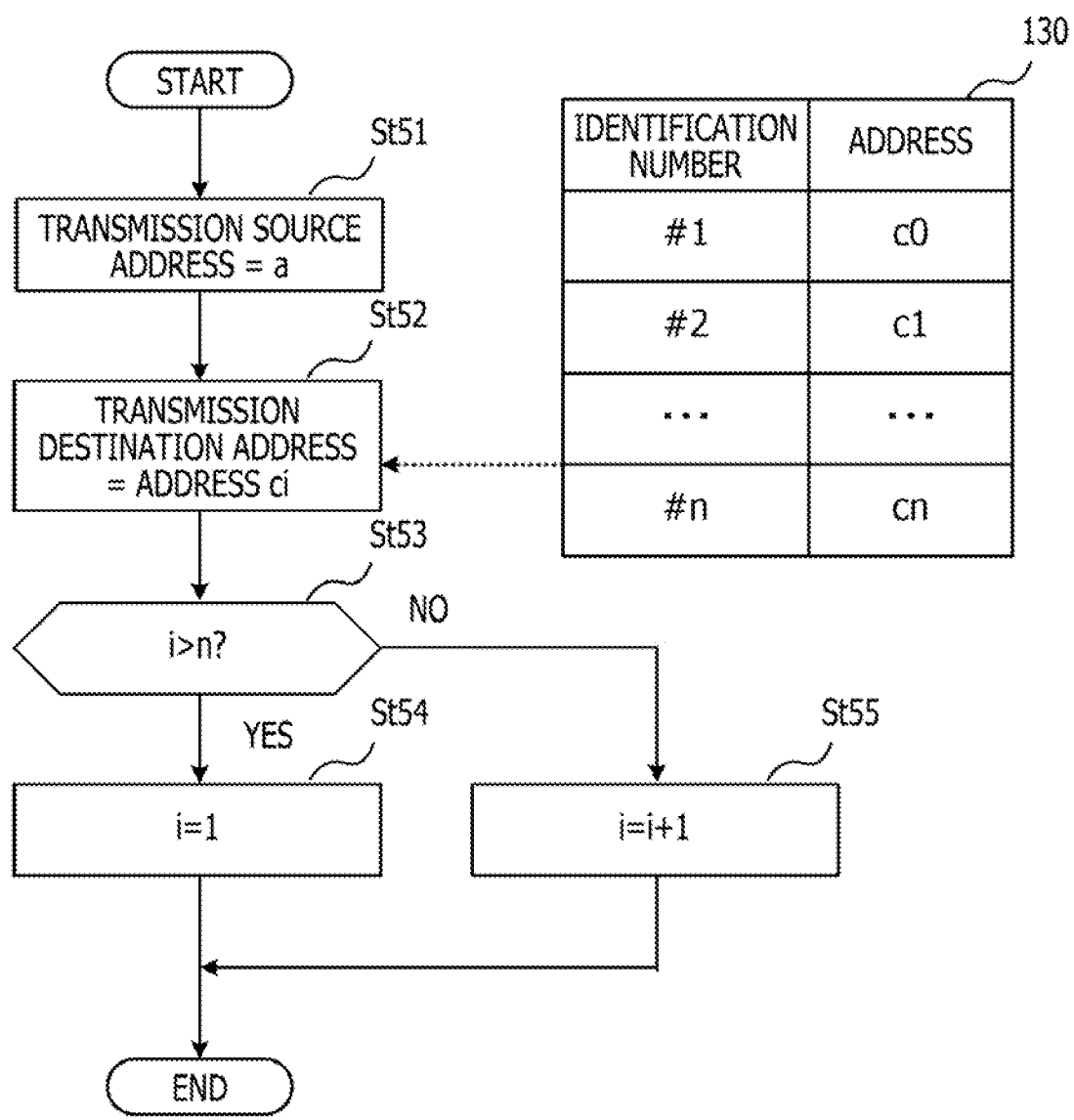
FIG. 15 is a flowchart illustrating an example of processing of generating the inspection packet.

FIG. 15 is a flowchart illustrating an example of processing of generating the inspection packet. The packet generation unit 101 sets "a" as the transmission source address of the inspection packet (operation St51).

In the address DB 130 of this example, addresses "c0" to "cn" are registered so as to correspond to identification numbers #1 to #n (n: positive integer). For example, the storage memory 13 retains the addresses "c0" to "cn" which are candidates for the transmission destination address "c" of the inspection packet. The storage memory 13 is an example of a retainment unit.

After the processing of operation St51, the packet generation unit 101 reads out the address "ci" of the identification number #i (i: positive integer) from the address DB 130 and sets the address "ci" as the transmission destination address of the inspection packet (operation St52). An initial value of the variable i is, for example, "1".

Subsequently, the packet generation unit 101 compares the variable i and n (operation St53). When the variable i is larger than n (Yes of operation St53), the packet generation unit 101 sets the variable i to 1 (operation St54). When the variable i is equal to or smaller than n (No of operation St53), the packet generation unit 101 adds 1 to the variable i (operation St55).

Accordingly, the packet generation unit 101 may select and set the addresses "c1" to "cn" as the transmission destination address in order from the identification numbers #1 to #n from the address DB 130 whenever the inspection packet is generated.

Figure 16:
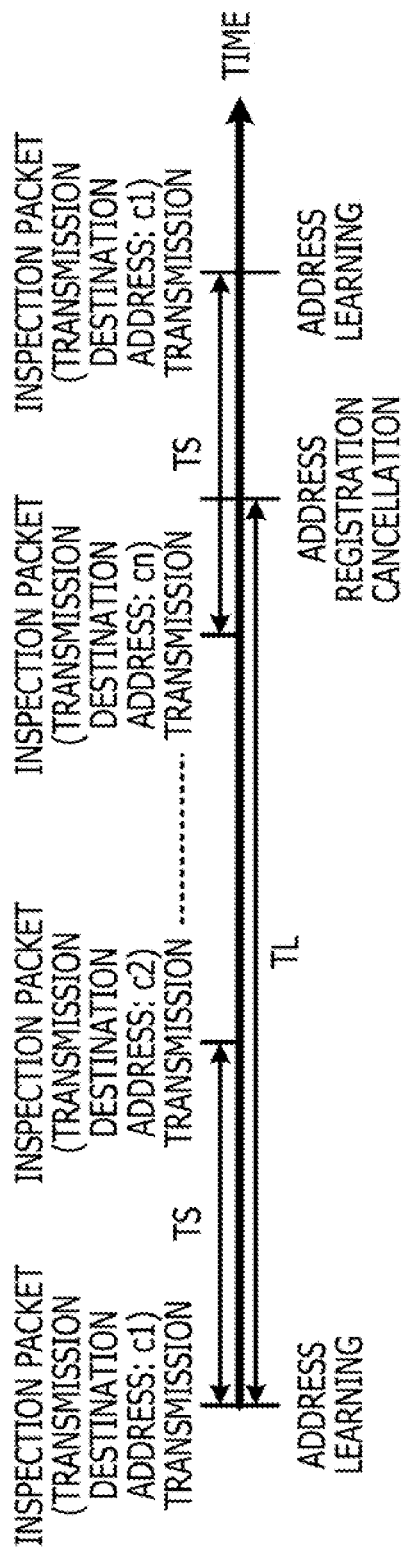
FIG. 16 is a time chart illustrating another example of the relationship between the transmission cycle of the inspection packet and the cache period.

FIG. 16 is a time chart illustrating another example of the relationship between the transmission cycle TS of the inspection packet and the cache period TL. The transmission processing unit 102 of the loop inspection device 1 transmits the inspection packet at the transmission cycle TS shorter than the cache period TL of the address learning tables 30a to 30c.

During the cache period TL, the transmission processing unit 102 sequentially transmits each of the inspection packets having the transmission destination addresses "c1" to "cn" at the transmission cycle TS. In response to this transmission, when the spoofed packets having the transmission source addresses "c1" to "cn" are transmitted from the packet discarding device 2, the transmission destination addresses "c1" to "cn" are sequentially registered in the address learning table 30a of the layer-2 switch 3a.

However, since different addresses "c1" to "cn" are designated for each transmission cycle TS in the transmission instruction transmitted from the loop inspection device 1 to the packet discarding device 2, the spoofed packets also have different transmission source addresses "c1" to "cn" for each transmission. Thus, the loop inspection device 1 may detect the loop path K even though the inspection packets are transmitted at the transmission cycle TS shorter than the cache period TL of the address learning tables 30a to 30c.

The number (n) of addresses registered in the address DB 130 is decided as the minimum n satisfying transmission cycle TS×number (n) of addresses>cache period TL. Accordingly, the transmission destination address of the inspection packet transmitted first after the cache period TL for the address "c1" elapses becomes "c1". Accordingly, the loop inspection device 1 may detect the loop path K even at the transmission cycle TS shorter than the cache period TL, and may further suppress the size of the address DB 130 by minimizing the number of addresses (n).

[Another Example of Loop Inspection Device]

Figure 17:
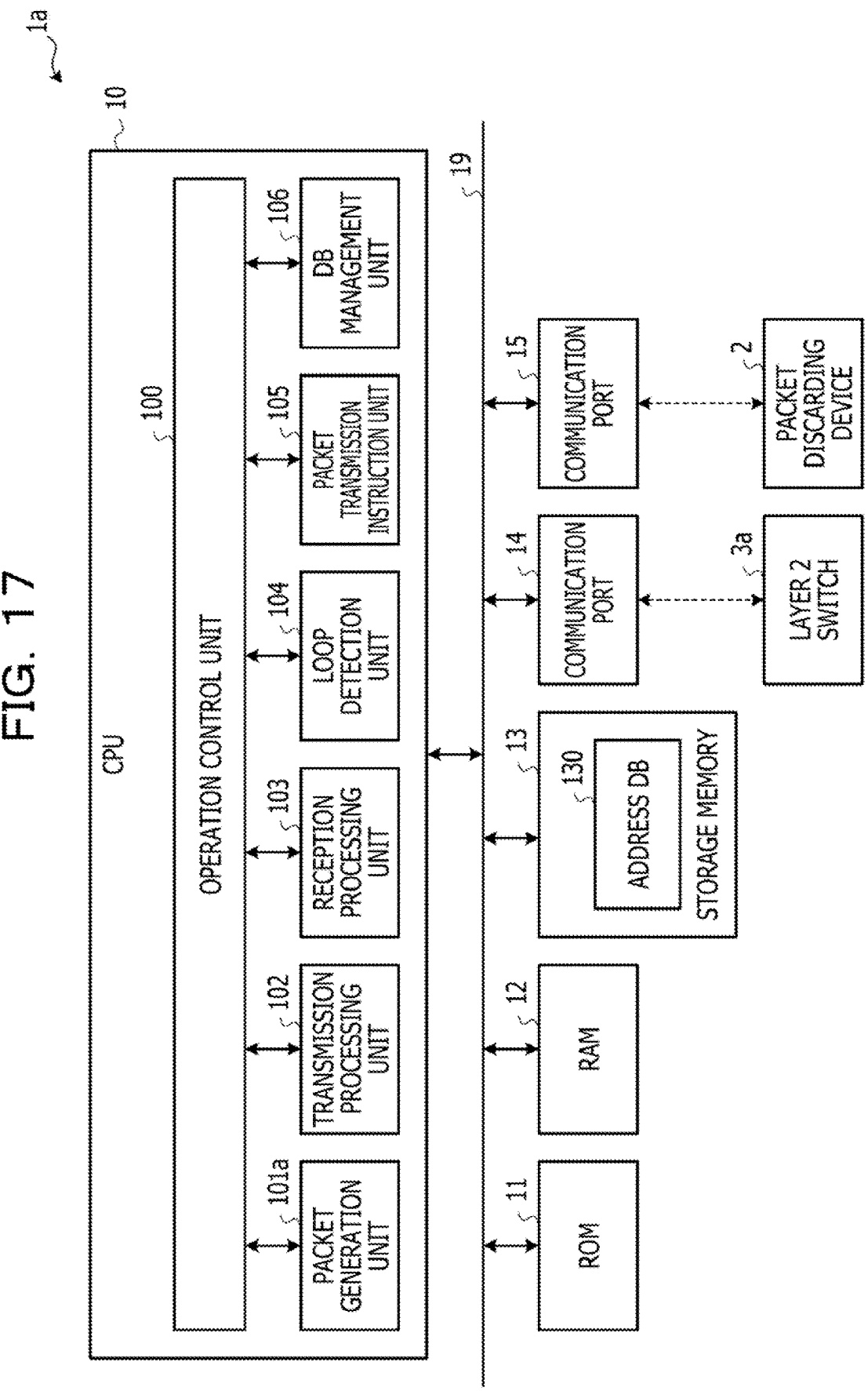
FIG. 17 is a configuration diagram illustrating another example of the loop inspection device.

FIG. 17 is a configuration diagram illustrating another example of the loop inspection device 1. Configurations illustrated in FIG. 17 are indicated by the same reference signs as the configurations illustrated in FIG. 7, and thus, the description thereof will be omitted.

In a loop inspection device 1a of this example, the CPU 10 reads the program from the ROM 11 and forms, as functions, the operation control unit 100, a packet generation unit 101a, the transmission processing unit 102, the reception processing unit 103, the loop detection unit 104, the packet transmission instruction unit 105, and a database (DB) management unit 106. The operation control unit 100 instructs the packet generation unit 101a, the transmission processing unit 102, the reception processing unit 103, the loop detection unit 104, the packet transmission instruction unit 105, and the DB management unit 106 to operate according to a predetermined sequence.

The packet generation unit 101a is an example of a selection unit, and sequentially selects the transmission destination address of the inspection packet from the candidates "c1" to "cn" for the transmission destination address of the inspection packet retained in the address DB 130. The DB management unit 106 is an example of a deletion unit, and deletes an address, among the addresses "c1" to "cn" registered in the address DB 130, which matches a transmission source address of a packet other than the inspection packet received by the reception processing unit 103, from the storage memory 13.

Thus, when the address registered (for example, is learned) in the address learning tables 30a to 30c is included in the addresses "c1" to "cn" in the address DB 130, the loop inspection device 1 may avoid the registered address from being set as the transmission destination address of the inspection packet.

Figure 18:
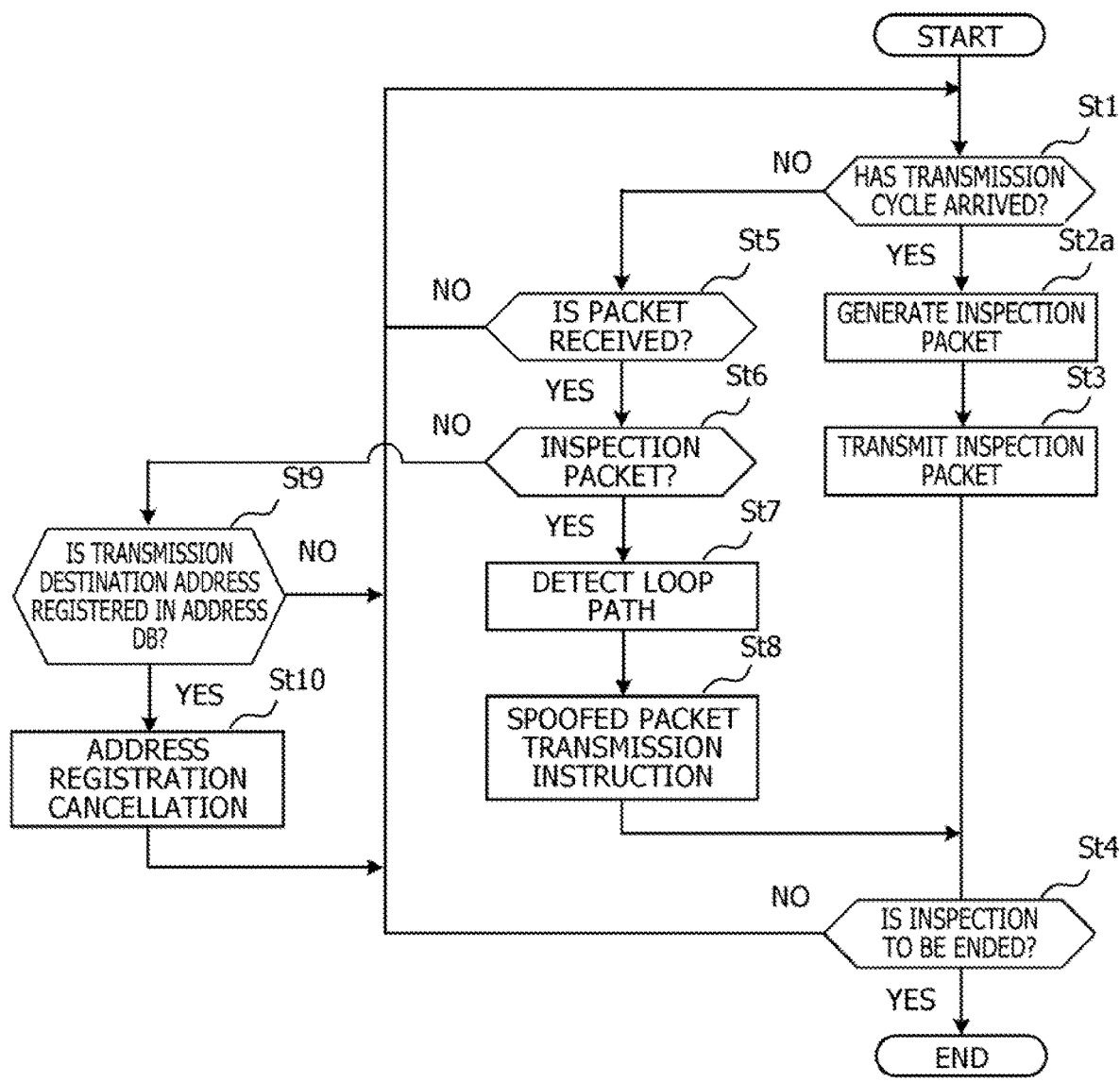
FIG. 18 is a flowchart illustrating another example of the operation of the loop inspection device.

FIG. 18 is a flowchart illustrating another example of the operation of the loop inspection device 1. In FIG. 18, tasks of processing common to the tasks of processing in FIG. 9 are denoted by the same reference signs, and the description thereof will be omitted.

When the received packet does not match the inspection packet (No of operation St6), the DB management unit 106 determines whether or not the transmission destination address of the received packet is registered in the address DB 130 according to an instruction from the operation control unit 100 (operation St9). When the transmission destination address of the received packet is not registered in the address DB 130 (No of operation St9), the processing in operation St4 is executed.

When the transmission destination address of the received packet is registered in the address DB 130 (Yes of operation St9), the DB management unit 106 cancels the registration of the addresses "c1" to "cn" matching the transmission destination address of the received packet from the address DB 130 (operation St10). For example, the DB management unit 106 excludes the addresses "c1" to "cn" matching the transmission destination address of the received packet from the candidates for the transmission destination address of the inspection packet registered in the address DB 130. Thereafter, the processing in operation St4 is executed.

As described below, the packet generation unit 101a sets the addresses "c1" to "cn" not cancelled from the address DB 130 as the transmission destination address of the inspection packet in the processing of generating the inspection packet (operation St2a).

Figure 19:
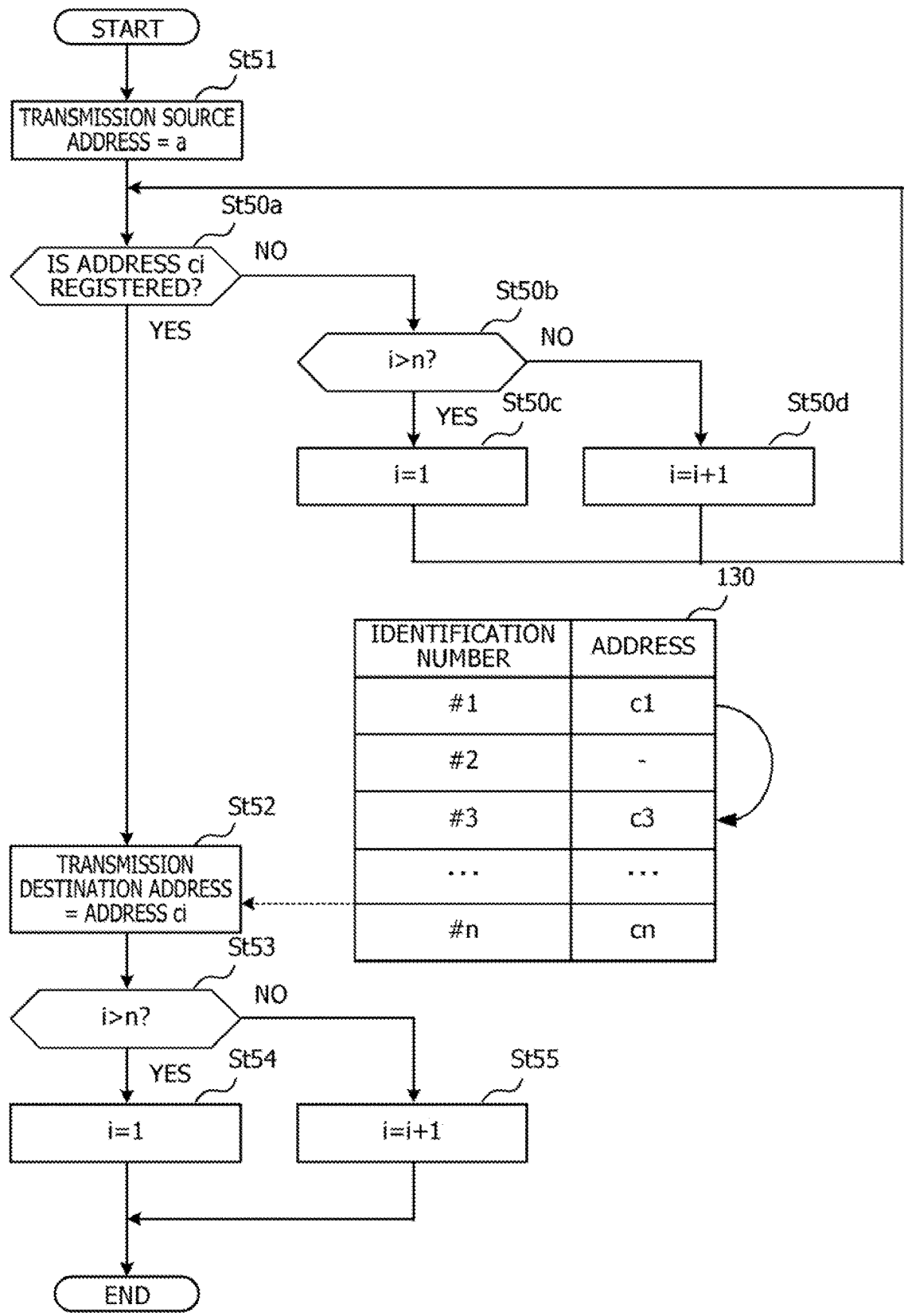
FIG. 19 is a flowchart illustrating another example of the processing of generating the inspection packet.

FIG. 19 is a flowchart illustrating another example of the generation processing of the inspection packet. In FIG. 19, tasks of processing common to the tasks of processing in FIG. 15 are denoted by the same reference signs, and the description thereof will be omitted.

After the transmission source address of the inspection packet is set to "a" (operation St51), the packet generation unit 101a determines whether or not the address "ci" of the identification number #i is registered in the address DB 130 (operation St50a). When the address "ci" of the identification number #i is registered in the address DB 130 (Yes of operation St50a), each processing in and after operation St52 is executed.

When the address "ci" of the identification number #i is deleted from the address DB 130 (No of operation St50a), the packet generation unit 101a compares the variable i and n (operation St50b). When the variable i is larger than n (Yes of operation St50b), the packet generation unit 101a sets the variable i to 1 (operation St50c). When the variable i is equal to or smaller than n (No of operation St50b), the packet generation unit 101 adds 1 to the variable i (operation St50d). Thereafter, the processing of operation St50a is executed again.

Accordingly, when the address "ci" of the identification number #i is deleted from the address DB 130, the packet generation unit 101a selects the registered address "ci" by changing the identification number #i. Thus, for example, when the address "c2" of the identification number #2 is deleted (see "–" in the address DB 130), the packet generation unit 101a selects the address "c3" of the identification number #3. For example, as indicated by an arrow, the packet generation unit 101a selects the address "c1" and then selects the address "c3".

As described above, the DB management unit 106 deletes the address, among the addresses "c1" to "cn" in the address DB 130 of the storage memory 13, which matches the transmission source address of the received packet. Thus, the loop inspection device 1a may transmit the inspection packet with, as transmission destination addresses, the addresses "c1" to "cn" not registered in each of the address learning tables 30a to 30c of the layer-2 switches 3a to 3c.

[Another Example of Inspection System]

Figure 20:
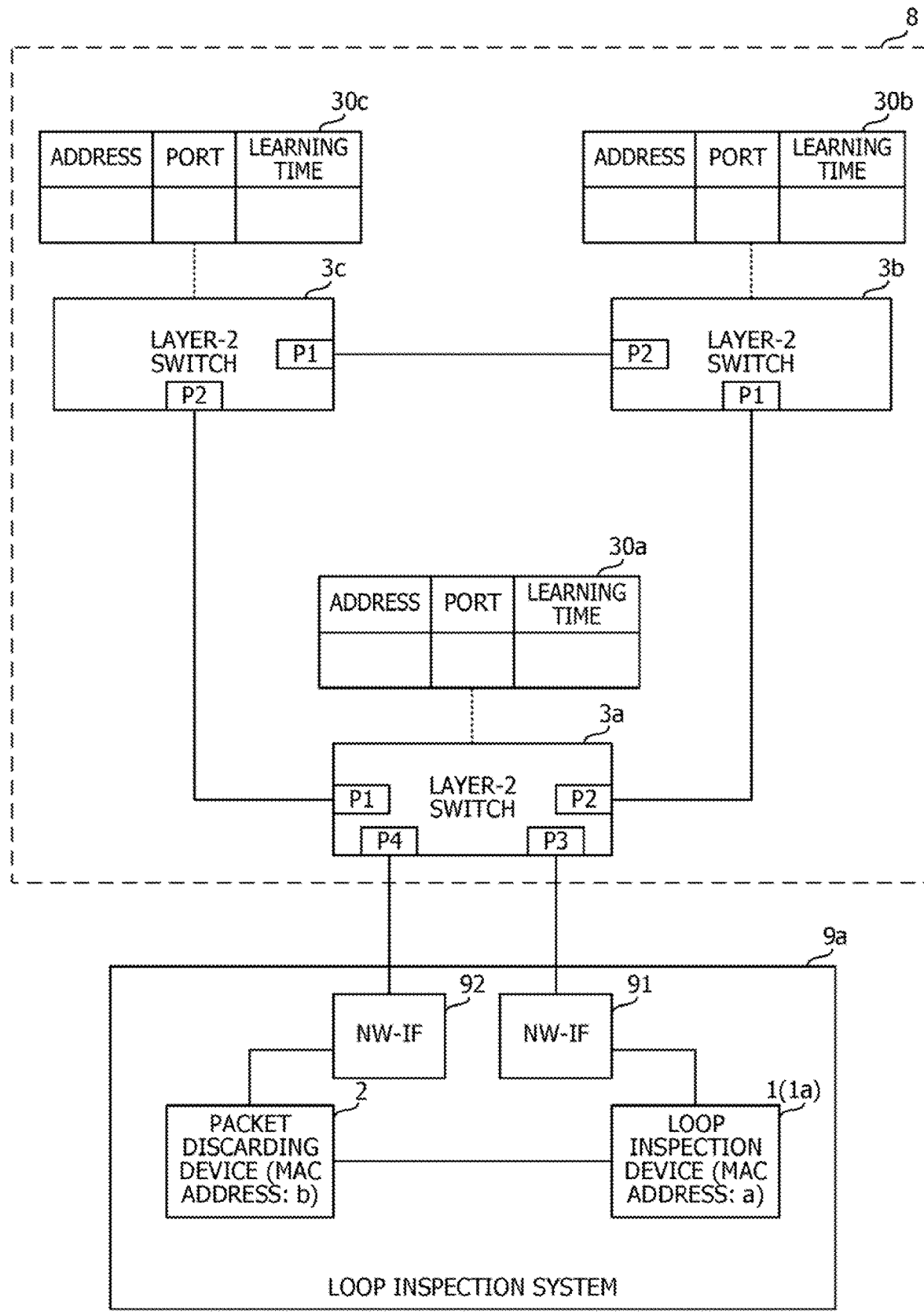
FIG. 20 is a configuration diagram illustrating another example of the inspection system.

FIG. 20 is a configuration diagram illustrating another example of the inspection system 9. An inspection system 9a is, for example, one server or a virtual machine (VM), and includes the loop inspection devices 1 and 1a, the packet discarding device 2, and network interfaces (NW-IF) 91 and 92.

The NW-IF 91 relays communication between the loop inspection devices 1 and 1a and the port P3 of the layer-2 switch 3a. The NW-IF 92 relays communication between the packet discarding device 2 and the port P4 of the layer-2 switch 3a. Accordingly, the inspection system 9a may execute the same inspection method as the inspection method of the inspection system 9 described above.

Although the loop inspection device 1 and the packet discarding device 2 are coupled to the common layer-2 switch 3a, the present disclosure is not limited thereto, and may be coupled to any of the layer-2 switches 3a to 3c in the network 8. For example, the packet discarding device 2 may be coupled to a port (not illustrated) of the layer-2 switch 3c. In this case, the layer-2 switch 3c registers the transmission destination address "c" of the spoofed packet or "c1" to "cn" in the address learning table 30c by receiving the spoofed packet from the packet discarding device 2.

The layer-2 switch 3c transfers the inspection packet to the packet discarding device 2 based on the address learning table 30c. Thus, as described above, the pressure on the communication band due to the inspection packet may be relieved.

The foregoing embodiment is a preferred embodiment of the present disclosure. However, the embodiment is not limited to this, various modification may be made without departing from the scope of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An inspection device comprising:
   a memory; and
   a processor coupled to the memory and configured to:
   transmit an inspection packet that includes, as a transmission destination address, a first address for which a plurality of transfer devices in a network does not learn correspondences between the first address and transfer destination devices, to a loop path of the network;
   receive a first packet from the network;
   determine whether the first packet matches the inspection packet;
   transmit, based on a determination of whether the first packet matches the inspection packet, a setting packet, of which a transmission source address is set to the first address, to the network,
   retain a plurality of candidates for the first address;
   sequentially select the first address of the inspection packet from among the plurality of candidates; and
   delete a candidate, among the plurality of candidates, which matches a transmission source address of the first packet other than the received inspection packet, from the retained candidates.

2. The inspection device according to claim 1, wherein each of the transfer devices retains the correspondences for a predetermined period from a learning time, and the processor is configured to transmit the inspection packet at a cycle longer than the predetermined period.

3. The inspection device according to claim 1, wherein
each of the transfer devices retains the correspondences for a predetermined period from a learning time, and
the processor is configured to transmit the inspection packet at a cycle shorter than the predetermined period, and change the first address whenever the inspection packet is transmitted.

4. The inspection device according to claim 1, wherein the processor is configured to determine whether the first packet matches the inspection packet, based on a transmission destination address, a transmission source address, or a type field of the first packet.

5. A packet processing device comprising:
a memory; and
a processor coupled to the memory and configured to:
acquire a first address for which a plurality of transfer devices in a network does not learn correspondences between the first address and transfer destination devices;
generate a setting packet of which a transmission source address is set to the first address;
transmit an inspection packet that includes the first address as a transmission destination address to a loop path of the network;
transmit the setting packet to the network;
receive the inspection packet from the network; and
generate the setting packet that includes a second address as the transmission destination address.

6. An inspection system comprising:
a memory; and
a processor coupled to the memory and configured to:
transmit a first packet;
transmit an inspection packet that includes, as a transmission destination address, a first address for which transfer devices do not learn correspondences between the first address and transfer destination devices, to a lop path of a network, the transfer devices forming the network coupled to the inspection system;
receive the first packet from the network;
determine whether the first packet matches the inspection packet;
transmit, based on a determination of whether the first packet matches the inspection packet, a setting packet, of which a transmission source address is set to the first address to the network;
acquire the first address based on an instruction for transmitting the setting packet;
generate the setting packet;
transmit the setting packet to the network after the inspection packet is transmitted to the network;
receive the inspection packet from the network,
retain a plurality of candidates for the first address;
sequentially select the first address of the inspection packet from among the plurality of candidates; and
delete a candidate, among the plurality of candidates, which matches a transmission source address of the first packet other than the received inspection packet, from the retained candidates.

7. The inspection system according to claim 6, wherein
each of the transfer devices retains the correspondences for a predetermined period from a learning time, and
the processor is configured to transmit the inspection packet at a cycle longer than the predetermined period.

8. The inspection system according to claim 6, wherein
each of the transfer devices retains the correspondences for a predetermined period from a learning time, and
the processor is configured to transmit the inspection packet at a cycle shorter than the predetermined period, and change the first address whenever the inspection packet is transmitted.

9. The inspection system according to claim 6, wherein the processor is configured to determine whether the first packet matches the inspection packet, based on a transmission destination address, a transmission source address, or a type field of the first packet.

* * * * *